HIGH SPEED TRIPLEX PUMP

Original Filed Feb. 1, 1960 10 Sheets-Sheet 1

INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN

HIGH SPEED TRIPLEX PUMP

Original Filed Feb. 1, 1960 10 Sheets-Sheet 2

INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN.

Sept. 29, 1964 C. J. COBERLY ETAL 3,150,594

HIGH SPEED TRIPLEX PUMP

Original Filed Feb. 1, 1960 10 Sheets-Sheet 3

INVENTORS.
CLARENCE J. COBERLY,
FRANCIS BARTON BROWN,
CARTER P. WILLIAMS,
By THEIR ATTORNEYS.
HARRIS, KIECH, RUSSELL & KERN

HIGH SPEED TRIPLEX PUMP

Original Filed Feb. 1, 1960

INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN.

HIGH SPEED TRIPLEX PUMP

Original Filed Feb. 1, 1960 10 Sheets-Sheet 5

INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN.

INVENTORS.
CLARENCE J. COBERLY,
FRANCIS BARTON BROWN,
CARTER P. WILLIAMS
BY THEIR ATTORNEYS.
HARRIS, KIECH, RUSSELL & KERN

INVENTORS.
CLARENCE J. COBERLY,
FRANCIS BARTON BROWN,
CARTER P. WILLIAMS,
By THEIR ATTORNEYS.
HARRIS, KIECH, RUSSELL & KERN.

INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN.

FIG. 22.
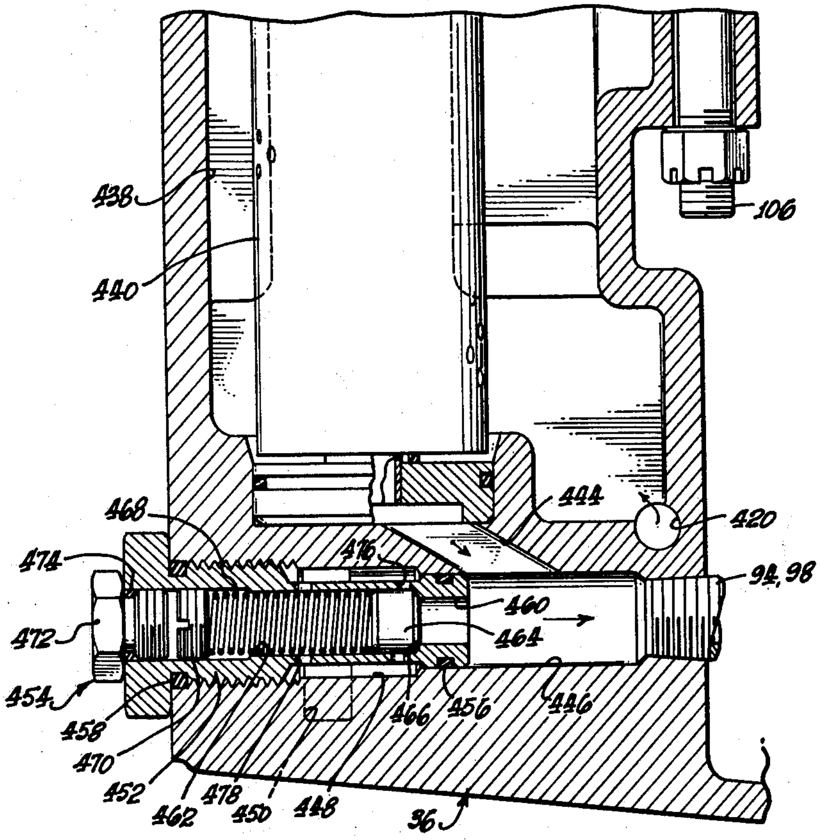
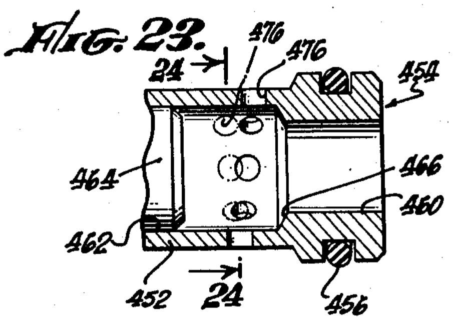
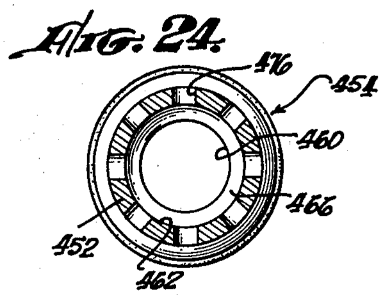
INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN.

HIGH SPEED TRIPLEX PUMP

Original Filed Feb. 1, 1960 10 Sheets-Sheet 10

INVENTORS.
CLARENCE J. COBERLY,
FRANCIS BARTON BROWN,
CARTER P. WILLIAMS,
BY THEIR ATTORNEYS.
HARRIS, KIECH, RUSSELL & KERN.

United States Patent Office 3,150,594
Patented Sept. 29, 1964

3,150,594
HIGH SPEED TRIPLEX PUMP

Clarence J. Coberly, San Marino, and Francis Barton Brown and Carter P. Williams, La Crescenta, Calif., assignors to Kobe, Inc., Huntington Park, Calif., a corporation of California Original application Feb. 1, 1960, Ser. No. 5,840, now Patent No. 3,077,836, dated Feb. 19, 1963. Divided and this application Aug. 27, 1962, Ser. No. 219,581
2 Claims. (Cl. 103—5)

This application is a division of our co-pending application Serial No. 5,840, filed February 1, 1960, now Patent No. 3,077,836, granted Feb. 19, 1963.

The present invention relates in general to pumps of the reciprocating type capable of delivering fluids at high pressures, e.g., several thousand pounds per square inch, and relates more particularly to a so-called triplex pump for oil field use to deliver oil under high pressure to fluid operated well pumps, to supply water under high pressure for water flooding operations, and the like. However, it will be understood that the triplex pump of the invention may be utilized for other purposes.

A conventional triplex pump, such as that disclosed in Patent No. 2,081,224, granted May 25, 1937, to Clarence J. Coberly, one of the applicants herein, and Clyde F. Hanson, has a low crankshaft speed, e.g., 200 to 400 r.p.m. and, therefore, must be a large and heavy affair to provide a useful power output, the result being a low power output per unit of space taken up and a low power output per unit of weight. Also, since prime movers suitable for triplex pump operation have shaft speeds much higher than the crankshaft speed of a conventional triplex pump, it is necessary to interpose a speed reducer, such as a gear reduction unit, between the prime mover shaft and the triplex crankshaft, as disclosed in the aforementioned Coberly et al. patent, for example. Such a speed reducer is not only expensive, but it further increases the size and weight of the complete triplex pump installation.

The primary object of the present invention is to overcome the foregoing and various other disadvantages of prior triplex pumps by providing a triplex pump which is capable of operating at much higher crankshaft speeds than any heretofore attainable, i.e., which is capable of crankshaft speeds considerably in excess of 1000 r.p.m.

One important result of the high crankshaft speeds attainable with the triplex pump of the present invention is that such speeds correspond to the shaft speeds of prime movers suitable for triplex operation. For example, the reciprocating internal combustion engines, such as gas engines, widely used in oil fields have crankshaft speeds ranging generally from 1000 to 1800 r.p.m.

Consequently, the crankshaft of the triplex pump of the present invention can be coupled directly to the prime mover shaft, e.g., the crankshaft of a gas engine, without interposing any speed reducer therebetween, the provision of a prime mover and triplex pump combination having a direct coupling between the prime mover shaft and the crankshaft of the triplex pump being a basic object of the invention. A related object is to provide a gas engine and triplex pump combination wherein the crankshaft of the triplex pump is coupled directly to the crankshaft of the gas engine without any speed reducer or clutch between the triplex pump and the gas engine.

Another result of the high crankshaft speeds of the triplex pump of the invention is a substantial reduction in the size and weight of the triplex pump, compared to prior, low speed triplex pumps. Expressed differently the present invention attains a substantially higher power output for the same size and weight as the result of the higher crankshaft speeds. For example, it can be shown that the power outputs, weights and crankshaft speeds of two triplex pumps being compared are related in accordance with the equation $$P_1/P_2=W_1/W_2(N_1/N_2)^{2/3}$$

where $P_1$ and $P_2$ are the respective power outputs of the two triplexes, $W_1$ and $W_2$ are the respective weights thereof and $N_1$ and $N_2$ are the respective crankshaft speeds thereof. As an illustration, the foregoing equation shows that, for the same weight, a triplex having a crankshaft speed of 300 r.p.m. will have a power output of only 40 hp., whereas a triplex having a crankshaft speed of 1200 r.p.m. will have a power output of 100 hp. Conversely, it can be shown, by means of the foregoing equation, that, for the same power output, the higher crankshaft speed results in a considerably lower weight.

The lower triplex pump weight attainable with the higher crankshaft speed of the present invention for a given power output permits mounting the triplex pump directly on the prime mover, a primary object of the invention being to provide a triplex pump and prime mover combination wherein the triplex pump is mounted directly on the prime mover. An important advantage of this construction is that no separate base for the triplex pump is necessary, the prime mover itself serving as the triplex pump base. The elimination of a separate base results in a more compact installation having smaller space requirements and results in a further reduction in the overall weight of the installation.

More particularly, an important object of the invention is to provide a prime mover and triplex pump combination wherein the housing of the triplex pump is bolted, or otherwise secured to, the housing of the prime mover with the crankshaft of the triplex pump and the prime mover shaft disposed in axial alignment and in end-to-end relation, the triplex crankshaft being coupled directly to the prime mover shaft.

Still another object of the invention is to further simplify and enhance the compactness of the prime mover and triplex pump combination by mounting various accessories normally associated with and/or forming part of triplex pumps directly on the triplex pump housing so that no separate base therefor is required. More particularly, an important object is to mount a booster or charge pump, for supplying fluid under pressure to the inlets of the triplex pump, directly on the triplex housing with the shaft of the booster pump directly coupled to the crankshaft of the triplex pump. Still more particularly, an object of the invention is to bolt or otherwise secure the booster pump housing to the triplex housing with the shaft of the booster pump in axial alignment with and in end-to-end relation with the triplex crankshaft and to directly couple the booster pump shaft to the triplex crankshaft.

The foregoing objects, advantages, features and results of the present invention, together with various other objects, advantages, features and results thereof which will be evident to those skilled in the triplex pump art in the light of this disclosure, may be achieved with the exemplary embodiment of the invention described in detail hereinafter and illustrated in the accompanying drawings, in which.

Figure 3:
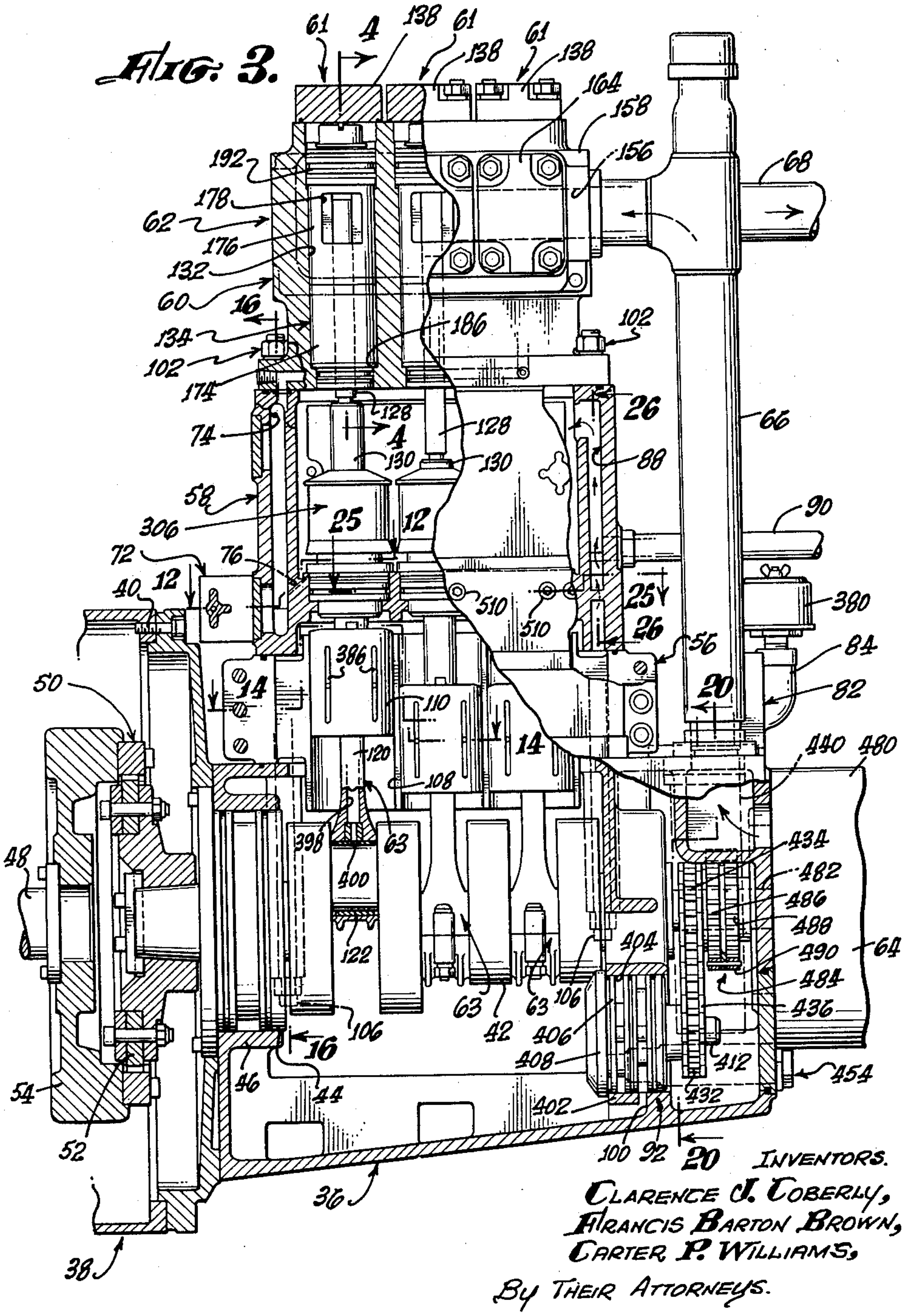
FIG. 3 is a side elevational view, partially in vertical section, showing the triplex pump of the invention and the manner in which it is mounted on the gas engine.
Figures 4, 6, 7, 8:
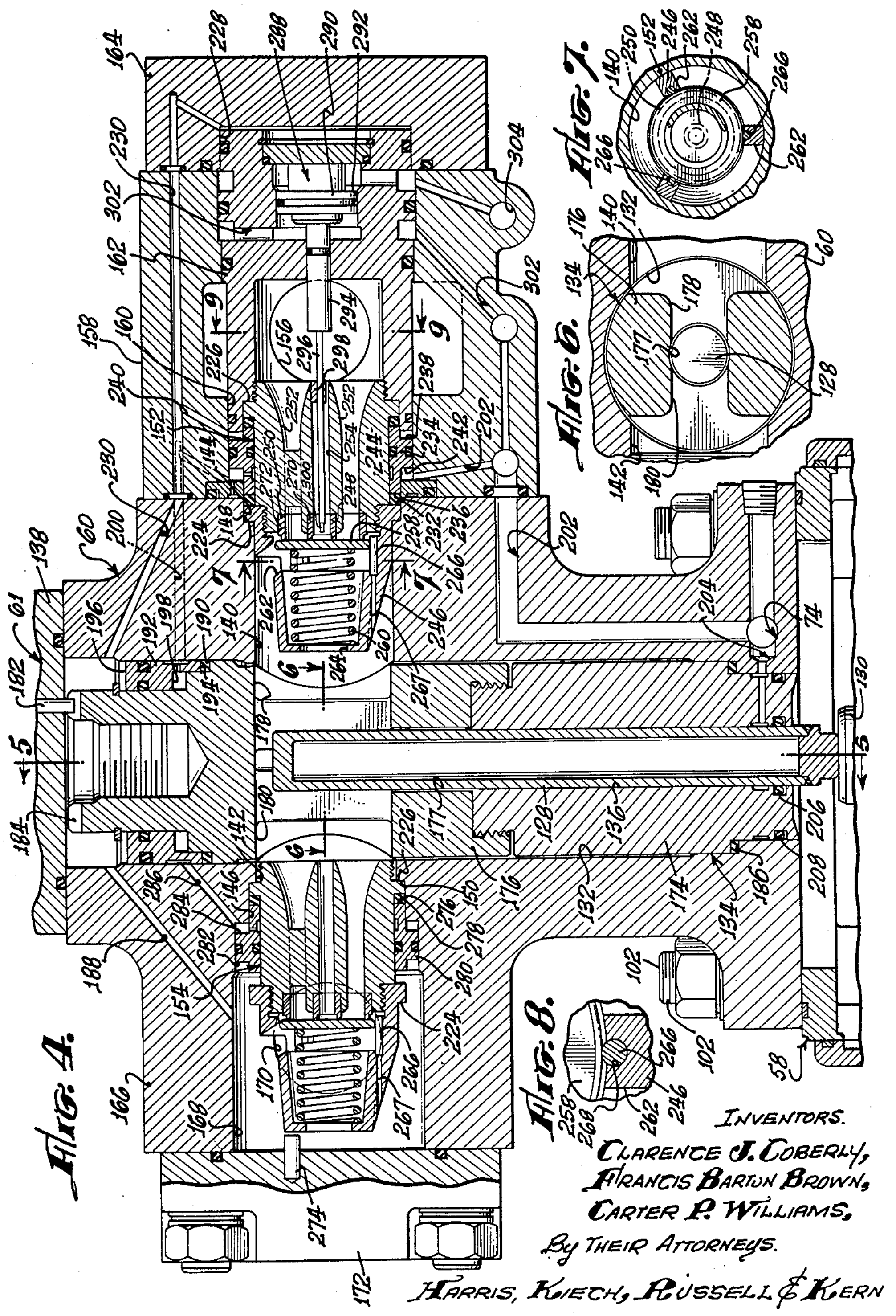
FIG. 4 is an enlarged, vertical sectional view which is taken along the arrowed line 4—4 of FIG. 3 and which illustrates one of the three pumping units forming the pumping means of the triplex.
Figures 5, 11:
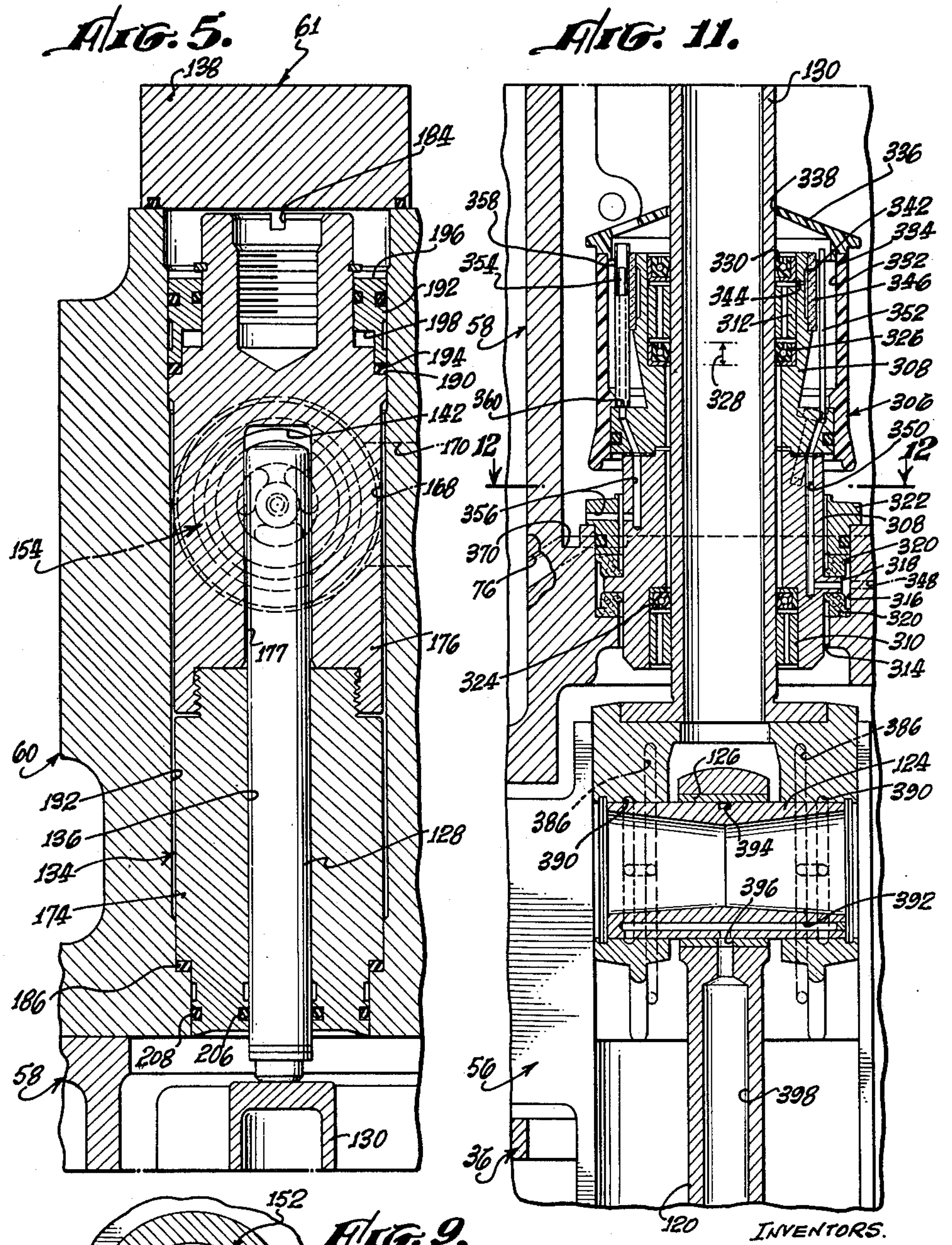
FIG. 5 is a vertical sectional view taken along the arrowed line 5—5 of FIG. 4.
Figure 9:
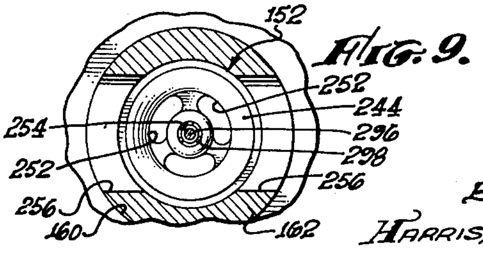
Figures 10, 12, 13:
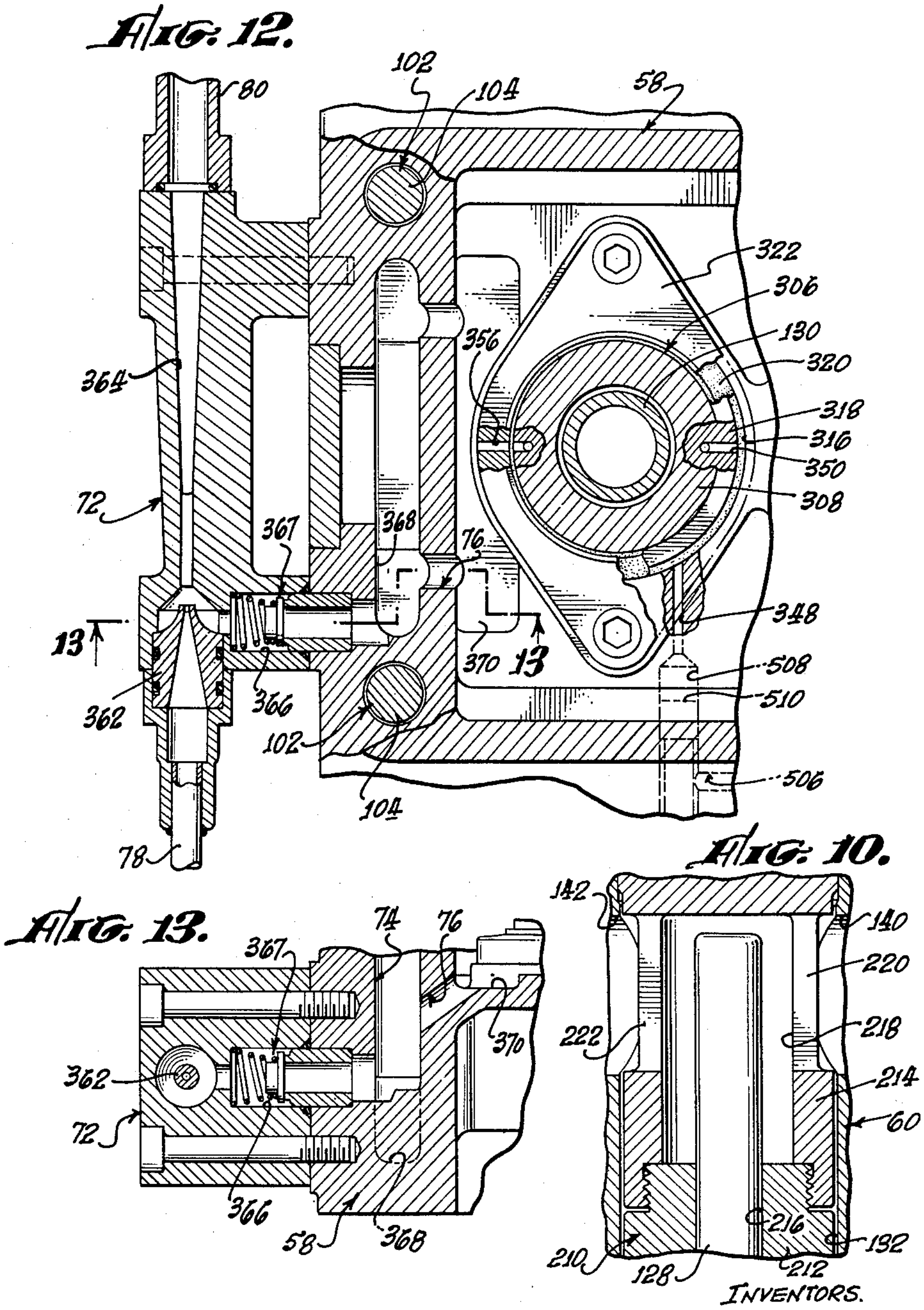
Figures 14, 15, 16, 17:
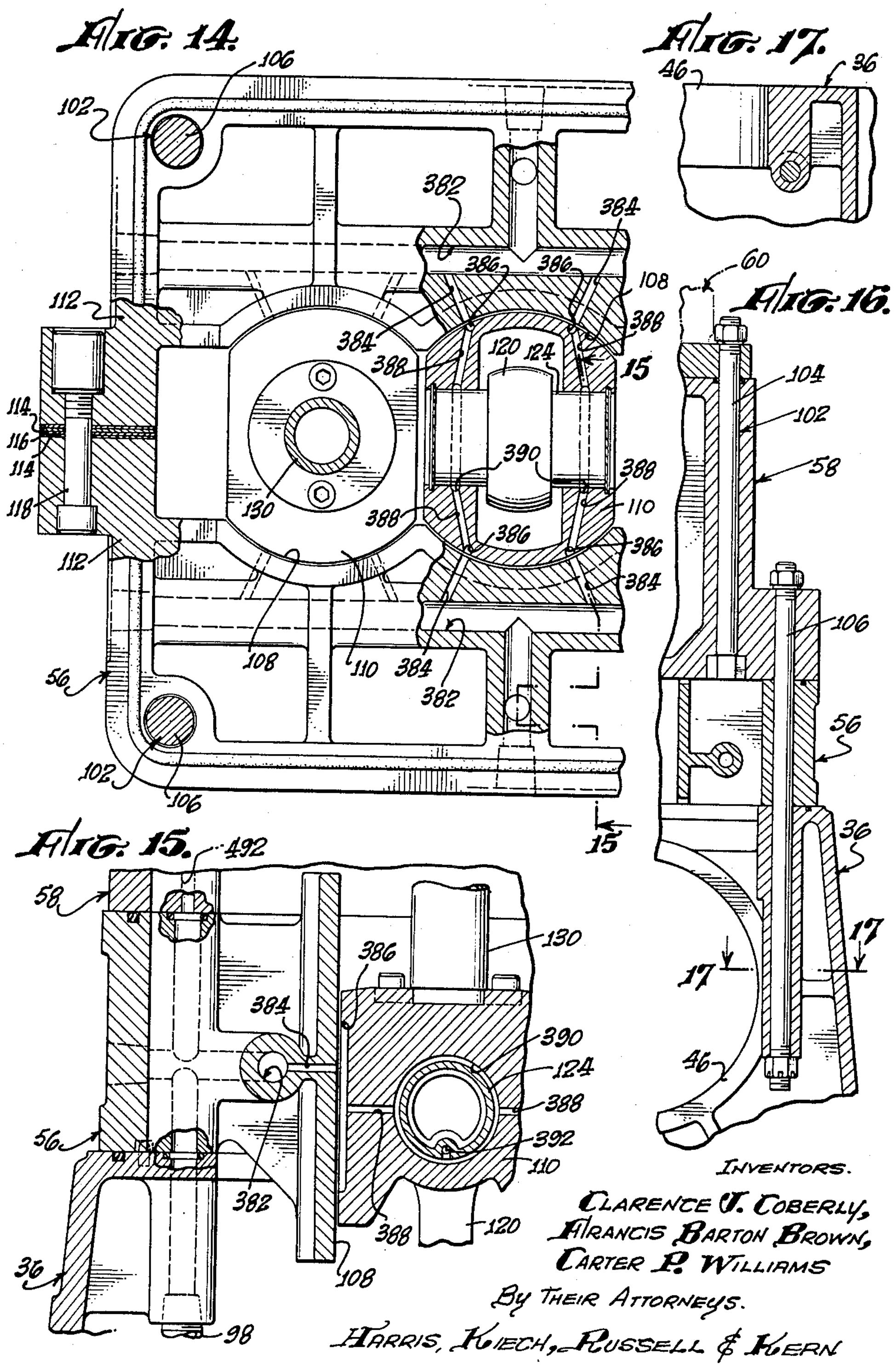
Figure 18:
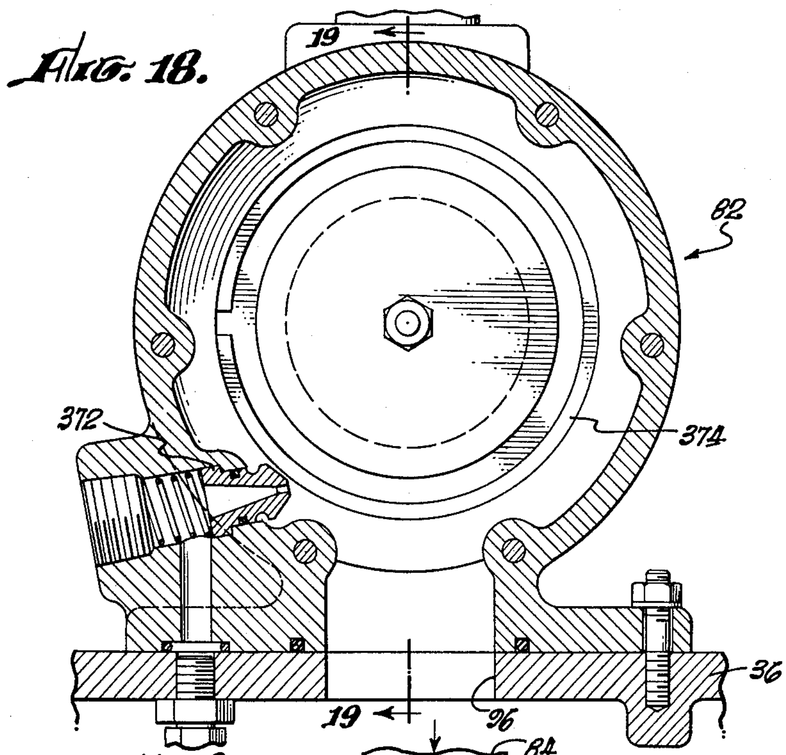
Figure 19:
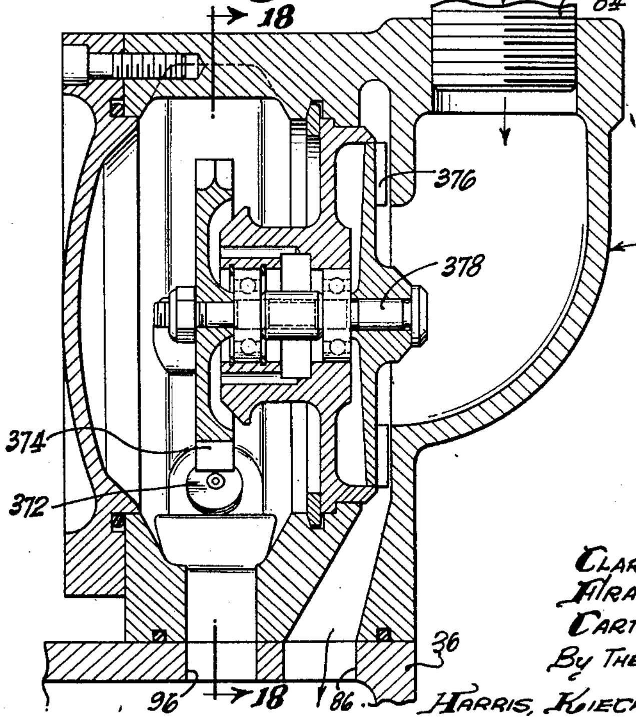
Figure 20:
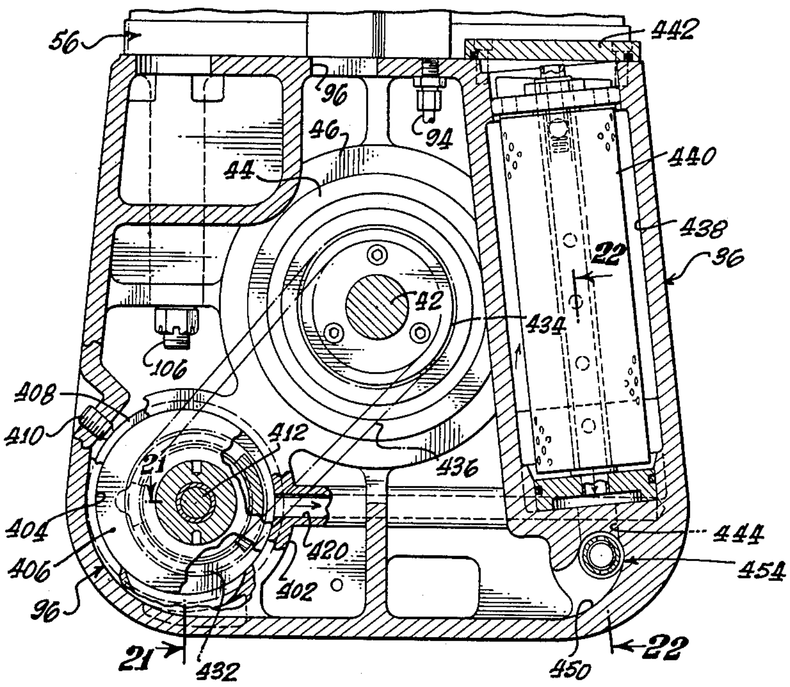
Figure 21:
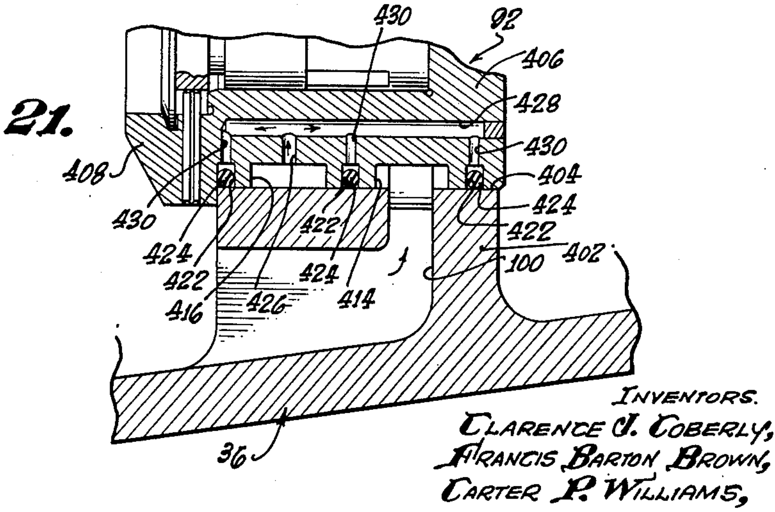
Figure 25:
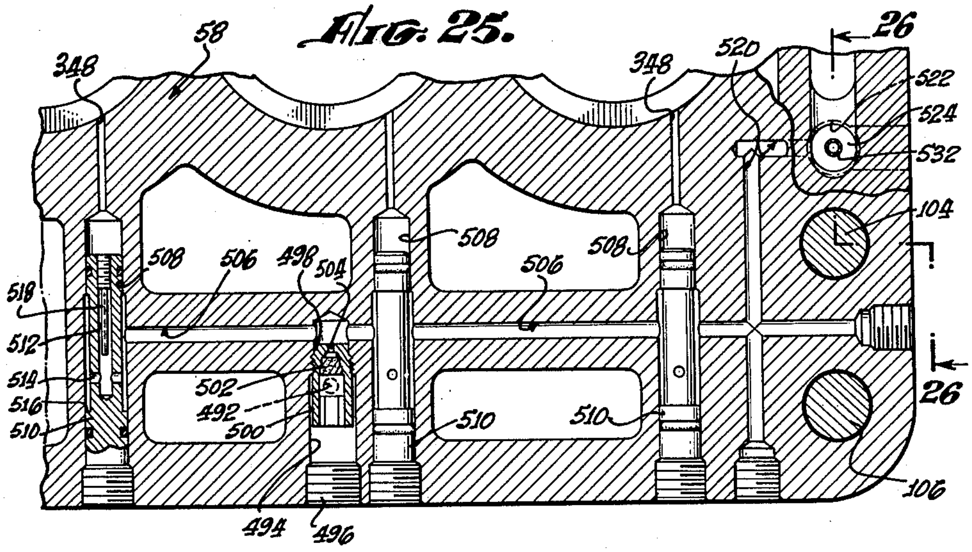
Figure 26:
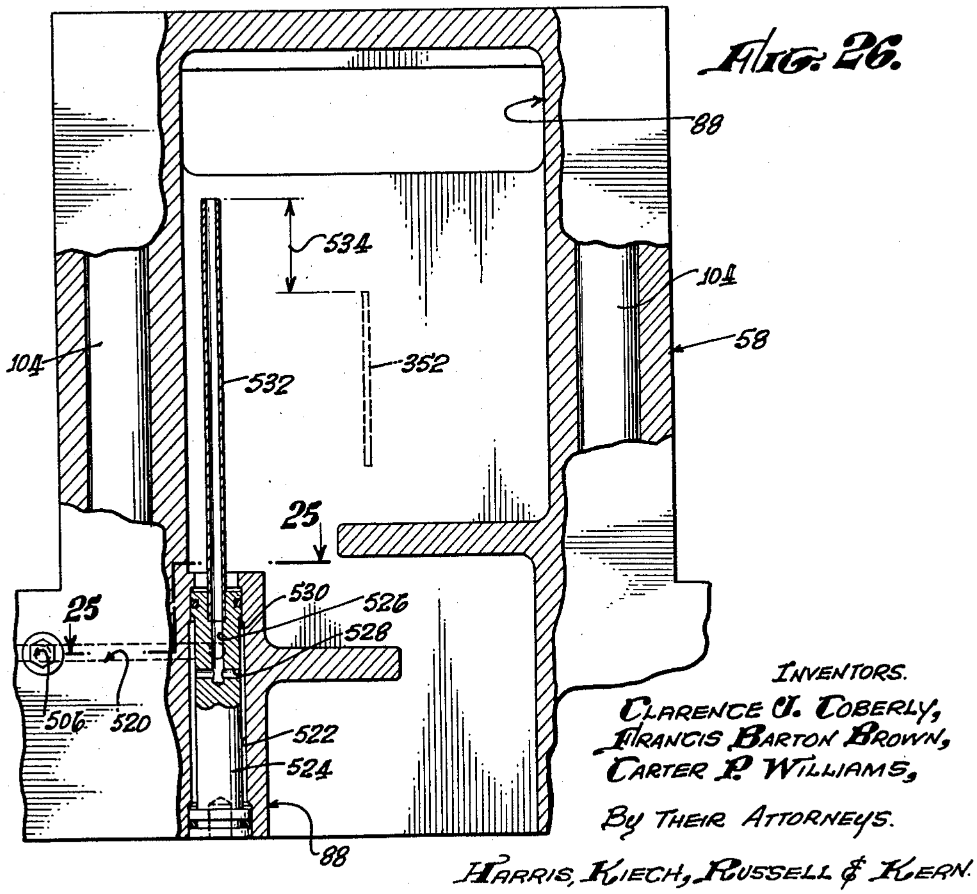

FIGS. 6 and 7 are fragmentary sectional views respectively taken along the arrowed lines 6—6 and 7—7 of FIG. 4;

FIG. 8 is a fragmentary sectional view duplicating a portion of FIG. 7 on an enlarged scale;

FIG. 9 is a fragmentary sectional view taken along the arrowed line 9—9 of FIG. 4;

FIG. 10 is a fragmentary vertical sectional view similar to a portion of FIG. 5, but illustrating an alternative construction;

FIG. 11 is a fragmentary vertical sectional view which is a downward continuation of FIG. 5;

FIG. 12 is an enlarged, fragmentary horizontal sectional view taken along the irregular arrowed line 12—12 of FIG. 3;

FIG. 13 is a fragmentary sectional view taken along the irregular arrowed line 13—13 of FIG. 12;

FIG. 14 is an enlarged, fragmentary horizontal sectional view taken along the irregular arrowed line 14—14 of FIG. 3;

FIG. 15 is a fragmentary sectional view taken along the irregular arrowed line 15—15 of FIG. 14;

FIG. 16 is an enlarged, fragmentary sectional view taken along the arrowed line 16—16 of FIG. 3;

FIG. 17 is a fragmentary sectional view taken along the arrowed line 17—17 of FIG. 16;

FIGS. 18 and 19 are enlarged sectional views of a crankcase and spacer block ventilating means embodied in the triplex pump of the invention, FIG. 18 being a transverse sectional view of the ventilating means which is taken along the arrowed line 18—18 of FIG. 19, and FIG. 19 being a longtiudinal sectional view of the ventilating means which is taken along the arrowed line 19—19 of FIG. 18;

FIG. 20 is an enlarged, vertical sectional view taken along the arrowed line 20—20 of FIG. 3;

FIG. 21 is an enlarged, fragmentary sectional view taken along the irregular arrowed line 21—21 of FIG. 20;

FIG. 22 is an enlarged, fragmentary sectional view taken along the arrowed line 22—22 of FIG. 20;

FIG. 23 is a fragmentary sectional view duplicating a portion of FIG. 22 on a larger scale and with parts in different relative positions than those shown in FIG. 22;

FIG. 24 is a sectional view taken along the arrowed line 24—24 of FIG. 23;

FIG. 25 is an enlarged, fragmentary sectional view taken along the arrowed line 25—25 of FIG. 3; and FIG. 26 is an enlarged, fragmentary sectional view taken along the arrowed line 26—26 of FIG. 3, or taken along the arrowed line 26—26 of FIG. 25 of the drawings.

*Engine-Triplex Combination*

Figure 2:
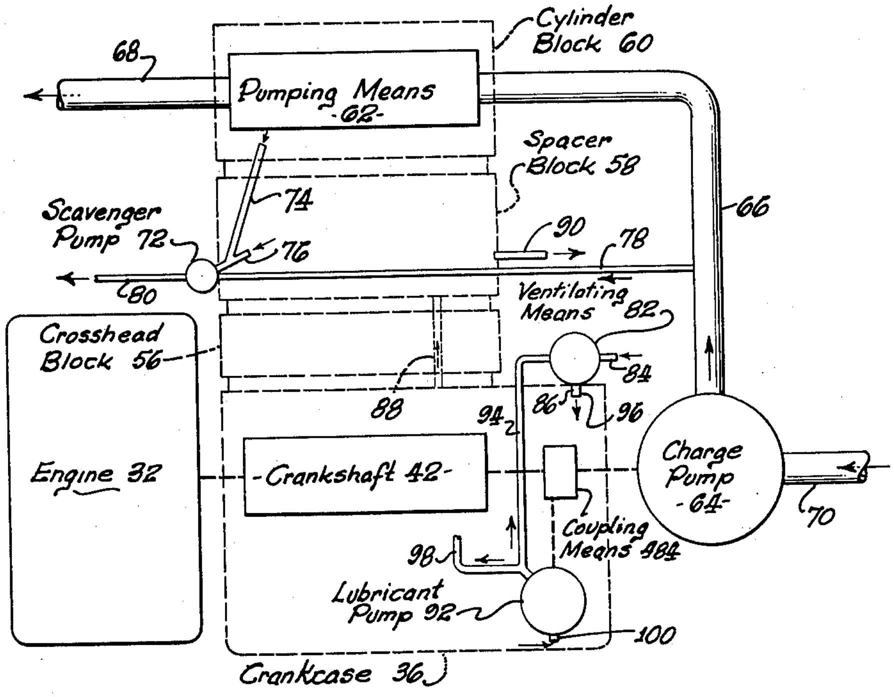
FIG. 2 is a diagrammatic view of the engine and triplex combination illustrating the basic components of the pump and the fluid flows therethrough.
Figure 1:
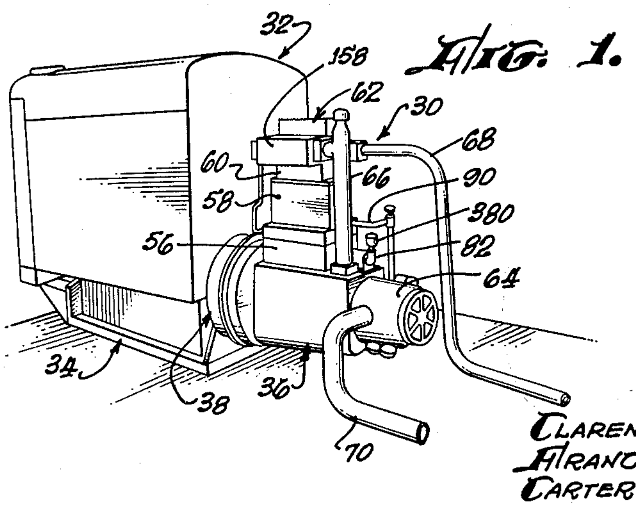
FIG. 1 is a perspective view of a gas engine and triplex pump combination of the invention.

Referring particularly to FIGS. 1 to 3 of the drawings, the high speed triplex pump of the invention is designated generally by the numeral 30 and is mounted on and carried by a prime mover 32, the latter being an internal combustion engine of the reciprocating type in the particular construction illustrated. Since reciprocating-type internal combustion engines commonly used in oil fields usually burn gaseous fuels, the engine 32 will normally be a gas engine, but this is not essential since any type of engine or motor may be utilized to mount and drive the triplex pump 30.

It will be noted from FIG. 1 in particular that the entire triplex pump 30 is supported solely by the gas engine 32, the base 34 with which the latter is conventionally provided thus serving as the base for the entire engine-triplex combination so that no separate base is required. This results in a much more compact and lighter engine-pump combination then anything heretofore available, which is an important feature.

Considering the mounting of the triplex pump 30 on the engine 32 in more detail, and referring particularly to FIG. 3 of the drawings, the housing of the triplex pump includes a crankcase 36 which is secured directly to the crankcase 38 of the engine, as by bolts 40. As will become apparent, all of the components of the triplex pump 30 are carried directly or indirectly by the triplex crankcase 36. Consequently, since the triplex crankcase 36 is bolted directly to the engine crankcase 38, the entire triplex pump 30 is supported solely by the engine 32.

The triplex pump 30 includes a crankshaft 42 which is disposed in the triplex crankcase 36 and which is mounted in two main bearings 44, FIGS. 3, 16 and 20, respectively disposed within main bearing housings 46 integral with the triplex crankcase. As best shown in FIG. 3 of the drawings, the triplex crankshaft 42 and the engine crankshaft 48 are positioned in axial alignment and in end-to-end relation, the triplex crankshaft being coupled directly to the engine crankshaft by any suitable coupling means 50. In the particular construction illustrated, the coupling means 50 comprises an externally splined coupling member 52 which is suitably secured to the triplex crankshaft 42 and which is meshed with an internally splined flywheel 54 mounted on the engine crankshaft 48.

With the foregoing construction, the triplex crankshaft 42 is driven directly by the engine crankshaft 48 at the speed of the latter, the structure of the triplex pump 30 which enables it to operate at the same speed as the engine 32 being described in detail hereinafter. One important advantage of the direct coupling between the triplex pump 30 and the gas engine 32 is that the higher triplex speed results in a much smaller and lighter triplex pump which can be mounted directly on the engine, as hereinbefore described, thereby obviating any necessity for a separate base. Another important advantage of the direct coupling which the present invention makes possible is that no speed reducer and clutch are required, thereby further minimizing the size and weight, and incidentally the cost, of the engine triplex combination.

*Triplex Pump 30 Generally*

Continuing to refer primarily to FIGS. 1 to 3 of the drawings, the housing of the triplex pump 30 includes, in addition to the crankcase 36, a crosshead block 56 superimposed on the crankcase, a spacer block 58 superimposed on the crossshead block, and a cylinder block 60 superimposed on the spacer block, the crossshead and spacer blocks providing a spacer means which spaces the cylinder block upwardly from the crankcase. The cylinder block 60 contains a pumping means, designated generally by the numeral 62 in FIG. 2, which includes three pumping units 61, FIG. 4, operatively connected to the crankshaft 42 by corresponding connecting means 63, FIG. 3, which extend upwardly from the crankshaft through the crosshead block 56 and the spacer block 58 to such pumping units, as will be described in detail hereinafter.

The fluid to be pumped by the pumping means 62 is delivered thereto under pressure by a booster or charge pump 64 through an inlet passage 66, the pumped fluid discharged by the pumping means exiting through an outlet passage 68 which leads to the desired point of use. The inlet of the booster pump 64 is connected to a suitable source of supply by a supply passage 70. As will be discussed in detail hereinafter, the booster pump 64 is mounted on the end of the triplex pump case 36 opposite the end thereof which is bolted to the engine crankcase 38, the booster pump being coupled directly to the end of the triplex crankshaft 42 opposite the end thereof which is coupled to the engine crankshaft 48.

The triplex pump 30 includes a scavenger pump 72 which scavenges pumped fluid leakage originating in the pumping means 62 from both the cylinder block 60 and the spacer block 58, the scavenger pump being shown schematically in FIG. 2, as having an inlet passage 74 communicating with the cylinder block and an inlet passage 76 communicating with the spacer block. Scavenging leakage originating in the pumping means 62 from the cylinder block 60, as well as from the spacer block 58, minimizes the amount of leakage entering the spacer block, and thus minimizes the amount of such leakage which must be handled by sealing devices associated with the connecting means 63 between the crankshaft 42 and the pumping means, as will be described. The scavenger pump 72 is a fluid operated pump which is actuated by fluid discharged by the booster pump 64 through a supply passage 78, shown diagrammatically in FIG. 2. The leakage fluid scavenged by the scavenger pump 72 and the spent operating fluid emanating from the scavenger pump are discharged into a common outlet passage 80 leading to a suitable point of disposal.

Contamination of the lubricating oil in the triplex crankcase 36 by vapor condensation is minimized by constantly scavenging vapors from both the crankcase and the spacer block 58. Vapor scavenging from the spacer block 58 is particularly important when the pumped fluid is crude oil, which is normally the case when the triplex pump 30 is utilized to supply power oil to well pumps. The crude oil frequently contains light ends which form vapors in the spacer block 58 as the result of leakage thereinto from the pumping means 62. The sealing devices associated with the connecting means 63 cannot prevent all such light-end vapors from migrating downwardly from the spacer block 58 into the crankcase 36, wherein they might condense to dilute the lubricating oil. Scavenging of vapors from both the crankcase 36 and the spacer block 58 minimizes such lubricating oil dilution, which is an important feature.

As shown diagrammatically in FIG. 2, vapor scavenging of the crankcase 36 and the spacer block 58 is effected by a ventilating means 82 having an air inlet 84 communicating with the atmosphere and an air outlet 86 communicating with the crankcase. The scavenging or ventilating air flows from the crankcase 36 into the spacer block 58 through a connecting passage 88, the scavenging or ventilating air being discharged from the spacer block through an outlet 90.

The ventilating means 82 shown is fluid operated, the operating fluid being lubricating oil from the crankcase 36 which is applied to the ventilating means by a lubricant pump 92 through a passage 94. The lubricating oil discharged by the ventilating means 82 is returned to the crankcase 36 through a passage 96, FIG. 19. The lubricant pump 92 also supplies lubricating oil from the crankcase to various components of the triplex pump 30 which require lubrication, as discussed in detail hereinafter, an outlet passage 98 from the lubricant pump being shown diagrammatically in FIG. 2 for this purpose. The lubricant pump 92, of course, draws lubricating oil from the crankcase 36, being provided with an inlet 100 for this purpose.

*Housing of Triplex Pump 30*

As hereinbefore briefly outlined, the triplex housing includes four basic components, viz., the crankcase 36, the crosshead block 56, the spacer block 58 and the cylinder block 60, the crankshaft 42 being carried by the crankcase, the pumping units 61 being carried by the cylinder block, and the connecting means 63 extending from the crankshaft through the crosshead and spacer blocks to the pumping units. The manner in which the four basic components of the triplex housing are secured together represents an important feature of the invention and will now be considered.

As will become apparent, the pumping units 61 apply upward hydraulic forces to the cylinder block 60, corresponding downward reaction forces being applied to the crankshaft 42 as the result thereof. The upward hydraulic forces applied to the cylinder block 60 are applied directly to the crankshaft 42, through the main bearings 44, to balance the downward reaction forces applied to the crankshaft. This is accomplished by the manner in which the cylinder block 60 is secured to the crankcase 36.

The cylinder block 60 is secured to the crankcase 36 by a plurality of connecting means 102 which connect the cylinder block directly to the main bearing housings 46. As best shown in FIG. 16, each connecting means 102 includes an upper tie rod or bolt 104 which extends through the spacer block 58 and a flange on the cylinder block 60 and thus secures the cylinder block to the spacer block. Each connecting means 102 also includes a lower tie rod or bolt 106 which is at least approximately aligned with the corresponding upper tie rod 104. Each lower tie rod 106 extends through a flange on the spacer block 58, through the crosshead block 56, and through a portion of the crankcase 36 which is integral with one of the main bearing housings 46. Thus, as will be apparent from FIG. 16, upward hydraulic forces acting on the cylinder block 60 are transmitted directly to the main bearing housings 46 through the tie rods 104 and 106, and thus are transmitted directly to the crankshaft 42 through the main bearings 44.

Another feature of the triplex housing resides in the particular structure of the crosshead block 56, which will now be considered. As best shown in FIG. 14, the crosshead block 56 is provided therethrough with crosshead guide bores 108 for crossheads 110 respectively forming parts of the connecting means 63, the axes of the crosshead guide bores being perpendicular to and in a plane containing the axis of rotation of the crankshaft 42. The crosshead block 56 is split longitudinally into two halves 112 having opposed surfaces 114 in planes parallel to the plane of the crosshead guide bores, a plurality of shims 116 being disposed between the opposed surfaces 114 at each end of the crosshead block 56. The two crosshead block halves 112 are secured together by bolts 118 extending through the shim sets 116. With this construction, when reboring of the crosshead guide bores 108 is necessary to compensate for wear, enough shims are removed from the two sets 116 to permit the crosshead block halves 112 to move toward each other sufficiently to permit reboring the crosshead guide bores 108 to their original diameters. Consequently, the rebored crosshead guide bores 108 will accommodate crossheads 110 of a standard diameter, it being unnecessary to manufacture and stock oversize crossheads, which is an important feature.

It will be noted that the crosshead block 56 is also a separate component of the triplex housing, being a separate part from the crankcase 36 and the spacer block 58. Consequently, if the crosshead block 56 cannot be rebored to the original diameters of the crosshead guide bores 108, it may be replaced by a new crosshead block without replacing any other component of the triplex housing.

*Connecting Means 63*

Referring to FIGS. 3 and 11 in particular, each of the connecting means 63 which interconnects the crankshaft 42 and one of the pumping units 61 includes a connecting rod 120 interconnecting the crankshaft and the corresponding crosshead 110. Each connecting rod 120 is connected at its lower end to the crankshaft 42 by a connecting rod bearing 122. Each crosshead 110 carries a wrist pin 124 and the corresponding connecting rod 120 is connected to the wrist pin by a wrist pin bearing 126. The connecting rods 120 convert rotary motion of the crankshaft 42 into reciprocatory motion of the crossheads 110 in an obvious manner.

The linear motion of the crossheads 110 is transmitted to pump plungers 128 of the pumping units 61 by crosshead stems 130. The latter are rigidly connected to the crossheads 110 and extend axially upwardly therefrom through the spacer block 58 into engagement with the lower ends of the pump plungers 128, the latter being coaxial with the crosshead stems, the crossheads and the crosshead guide bores 108.

As will be clear from FIGS. 3, 4 and 5 of the drawings, the pump plungers 128 are not connected to the crosshead stems 130 in any way, the lower ends of the pump plungers merely being engageable by the upper ends of the crosshead stems. Consequently, the connecting means 63 are capable only of producing the upward strokes of the pump plungers 128, but are incapable of producing the downward strokes thereof because of the absence of any structural interconnection between the pump plungers and the crosshead stems 130. As will become apparent, the upward strokes of the pump plungers 128 are the working strokes thereof, the downward strokes being the return strokes.

In order to effect the return strokes of the pump plungers 128, the discharge pressure of the booster pump 64 is constantly applied to the upper ends of the pump plungers through inlet check valves of the pumping units 61 which will be described hereinafter, the booster pump pressure being sufficiently high to cause the pump plungers to follow the crosshead stems 130 downwardly under normal operating conditions. For example, the discharge pressure of the booster pump 64 may be of the order of 250 p.s.i.

As will be apparent, if foreign matter tends to cause the pump plungers 128 to tend to stick, or if the pump plungers tend to stick for any other reason, they merely remain at the upper ends of their strokes as long as their resistance to downward movement exceeds the downward force applied to the upper end thereof by the booster pump discharge pressure. Thus, the lack of any structural connection between the pump plungers 128 and the crosshead stems 130, and the use of the booster pump discharge pressure to cause the pump plungers to follow the crosshead stems downwardly under normal operating conditions, provide a safety means for disengaging the pump plungers from the connecting means 63 in the event that the pump plungers tend to stick to such an extent as to damage various components of the triplex pump 30, such as the pumping means 62, the connecting means 63, the crankshaft 42 and the like. The importance of this feature will be recognized if it is kept in mind that the triplex pump 30 is required to operate for long periods of time with very little attention. Were it not for the foregoing means for disengaging the pump plungers 128 from the connecting means 63 when excessive pump plunger friction develops, the triplex pump 30 might be severely damaged before the next inspection and/or servicing trip by the operator thereof.

*Pumping Means 62 Generally*

Referring to FIGS. 3 to 5 of the drawings, and particularly FIG. 4 thereof, the cylinder block 60 is provided with three side-by-side liner bores 132 the axes of which are perpendicular to and in a plane containing the axis of the crankshaft 42. Each liner bore 132 contains a liner assembly 134 which provides a plunger bore 136 for the corresponding pump plunger 128. The axes of the plunger bores 136 are also perpendicular to and in a plane containing the axis of the crankshaft 42. The upper ends of the liner bores 132 are individually closed by independent closures 138 bolted, or otherwise secured, to the cylinder block 60. Consequently, each liner assembly 134 can be installed and removed independently of the others.

The cylinder block 60 is provided with inlet ports 140 respectively communicating with the liner bores 132 and is provided with diametrically opposite outlet ports 142 respectively communicating with the liner bores. Outwardly of the inlet and outlet ports 140 and 142 are inlet and outlet valve bores 144 and 146 in the cylinder block 60, the inlet and outlet valve bores respectively having at their inner ends annular seats 148 and 150 respectively engageable by inlet and outlet check valves or check valve assemblies 152 and 154.

The outer ends of the inlet check valves 152 communicate, in a manner to be described in more detail hereinafter, with an inlet or intake passage 156 in an inlet or intake manifold 158. The inlet passage 156 extends longitudinally of the inlet manifold 158 so that it communicates with the outer ends of all of the inlet check valves 152, the inlet passage 156 being suitably connected at one end to the inlet passage 66 leading from the outlet of the booster pump 64 to the pumping means 62. The inlet manifold 158 is regarded herein as forming a part of the cylinder block 60, but, in the particular construction shown, it is a separate part bolted, or otherwise secured, to the body of the cylinder block. The inlet manifold 158 is provided therein with bores 160 coaxial with and outwardly of the inlet valve bores 144, the bores 160 receiving therein retaining members 162 for hydraulically biasing the inlet check valves 152 into engagement with their respective seats 148. The outer ends of the bores 160 are closed individually by independent closures 164 bolted, or otherwise secured, to the inlet manifold 158. Thus, the inlet check valves 152 may be installed and removed independently of each other.

The cylinder block 60 is provided with an integral exhaust or outlet manifold 166 having therein bores 168 located outwardly of and coaxial with the outlet valve bores 146 and communicating with the outer ends of the outlet check valves 154. The bores 168 are interconnected by an outlet or exhaust passage 170 which extends longitudinally of the outlet manifold 166 and which is suitably connected at one end to the outlet passage 68 leading to the point of use of the pumped fluid discharged under pressure by the pumping means 62. The outer ends of the bores 168 are individually closed by independent closures 172 bolted, or otherwise secured, to the cylinder block 60, i.e., to the portion of the cylinder block which forms the outlet manifold 166. Consequently, the outlet check valves 154 may be installed and removed independently of each other.

*Liner Assembly 134*

Referring to FIGS. 3 to 6 of the drawings, each liner assembly 134 includes a liner 174 and a liner head 176 threadedly connected together, the plunger bore 136 communicating at its upper end with a slightly larger bore 177 in the liner head. The liner head is provided with inlet and outlet ports 178 and 180 therein which communicate with the upper end of the plunger bore 136, through the bore 177, and which register with the corresponding inlet and outlet ports 140 and 142, respectively, in the cylinder block 60. A pin 182 on the corresponding closure 138 is disposed in a transverse groove 184 in the upper end of the liner head 176 to maintain the inlet and outlet ports 178 and 180 in register with the corresponding inlet and outlet ports 140 and 142, respectively. It will be noted that the liner assembly 134 is symmetrical so that it can be installed in the corresponding liner bore 132 in either of two positions spaced 180° apart. Therefore, the groove 184 extends entirely across the upper end of the liner head 176.

Considering the manner in which the liner assembly 134 is sealed with respect to the cylinder block 60, an elastomeric annular sealing element 186 of polytetrafluoroethylene, for example, is located below the inlet and outlet ports 178 and 180 and is disposed between an external annular shoulder on the liner 174 and an internal annular shoulder or seat formed on the cylinder block 60 and extending into the corresponding liner bore 132 therein.

It will be noted that as the pump plunger 128 reciprocates in the plunger bore 136, the pressure applied to the upper end thereof alternates between the inlet pressure provided by the booster pump 64 and the discharge pressure, the difference between these pressures being several thousand p.s.i. The alternately high and low pressure acting on the upper end of the pump plunger 128 also acts upwardly on an equal area of the liner assembly 134, thereby tending to cause the sealing element 186 to alternately expand and contract. Such expansion and contraction of the sealing element 186, if permitted, would result in overheating of the sealing element due to internal friction, thereby destroying this sealing element in a very short time.

To prevent the foregoing, the sealing element 186 is pressure loaded to a pressure value much higher than the maximum pressure to be sealed against, which maximum is the pressure produced by the pump plunger 128 immediately prior to opening of the corresponding outlet check valve 154. Such pressure loading of the sealing element 186 is accomplished by applying the discharge pressure of the pumping means 62 in the downward direction to the entire cross-sectional area of the liner assembly 134. For this purpose, the cylinder block 60 is provided with a passage 188 which connects the upper end of the corresponding liner bore 132 to the bore 168 communicating with the outer end of the corresponding outlet check valve 154. Thus the discharge pressure of the pumping means 62 is applied to the entire upper end of the liner head 176, the area to which the discharge pressure is applied in this fashion being larger than the area exposed to the peak pressure produced by the pump plunger 128 and being much larger than the areas of the annular shoulders between which the sealing element 186 is disposed. Consequently, since the lower end of the liner assembly 134 is exposed to substantially atmospheric pressure in the spacer block 58, as shown in FIG. 4, the sealing element 186 is pressure loaded to a value several times the discharge pressure, and thus several times the maximum pressure to be sealed against, so that virtually no expansion and contraction of the sealing element 186 occur. Consequently, a long service life for the sealing element 186 is provided.

The same sealing principle as employed to provide a fluid-tight seal between the cylinder block 60 and the liner assembly 134 above the inlet and outlet ports 178 and 180 in the liner head 176. In this instance, an elastomeric annular sealing element 190, which may be of any suitable material, such as polytetrafluoroethylene, is seated against an external annular shoulder on the liner head 176. The sealing element 190 is pressure loaded to a value far in excess of the maximum pressure to be sealed against by a loading ring 192 which encircles the liner head 176 and which has a small, downwardly facing, annular area 194 in engagement with the sealing element 190. The loading ring 192 is provided with a large, upwardly facing, annular area 196 at its upper end which is exposed to the discharge pressure of the pumping means 62 through the passage 188 hereinbefore discussed, this upwardly facing annular area being several times as large as the downwardly facing annular area which engages the sealing element 190. The loading ring 192 is also provided with a downwardly facing, annular area 198 which is exposed to a much lower pressure than the discharge pressure of the pumping means 62, such lower pressure preferably being substantially atmospheric, as will be described in a subsequent paragraph.

With the foregoing construction, the loading ring 192 acts as an annular pressure amplifying element which applies to the sealing element 190 a pressure several times as large, e.g., three times as large, as the discharge pressure, and thus several times as large as the maximum pressure to be sealed against. Thus, virtually no expansion and contraction of the sealing element 190 occurs as the pressure to be sealed against alternates between the intake and discharge pressure.

Considering the manner in which the annular area 198 of the loading ring 192 is exposed to substantially atmospheric pressure, it communicates with a passage means 200 formed partially in the loading ring itself, partially in the cylinder block 60, and partially in the inlet manifold 158. The passage means 200 communicates with the corresponding bore 160 in the inlet manifold 158, the opposite side of such bore communicating with a passage means 202 formed partially in the inlet manifold and partially in the cylinder block. The passage means 202 communicates, in turn, with the inlet passage 74 of the scavenger pump 72. The inlet passage 74 leading to the scavenger pump 72 is always at a pressure substantially equal to atmospheric, whereby substantially atmospheric pressure is applied to the annular area 198 of the loading ring 192 through the scavenger-pump inlet passage 74, the passage means 202, the bore 160 and the passage means 200. The various components of the passage means 200 and 202 are not specifically identified on the drawings to avoid an excessively large number of reference numerals.

For the reasons set forth in the aforementioned prior patent, each pump plunger 128 fits relatively loosely in its bore 136, there being an actual clearance therebetween. Consequently, there is substantial leakage of the pumped liquid downwardly through the clearance between the pump plunger 128 and the wall of its bore 136. Virtually all of this leakage is drained off into the inlet passage 74 of the scavenger pump 72 in an annular region near the lower end of the plunger bore, this being accomplished by providing a drain passage means 204 in the liner 174 and the cylinder block 60 which leads from the plunger bore to the passage 74. Annular sealing elements 206 and 208 carried by the liner 174 and respectively engaging the pump plunger 128 and the cylinder block 60 below the drain passage means 204 substantially completely prevent any of the pumped liquid leaking downwardly past the pump plunger from entering the spacer block 58, thereby minimizing the amount of leakage which must be scavenged from the spacer block. It will be noted that the sealing elements 206 and 208 are exposed to substantially atmospheric pressure from both above and below. Consequently, these sealing elements are capable of diverting most of the leakage past the pump plunger 128 into the drain passage means 204.

Since the majority of the pump plunger leakage is conducted directly to the scavenger pump 72 in the foregoing manner, and thus does not enter the spacer block 58, greater clearances can be provided between the pump plungers 128 and the plunger bores 136 than would otherwise be possible. Such greater clearances, which may be of the order of 0.002 inch for a one inch plunger, are essential to the high speed operation of the triplex pump 30 of the invention.

Incidentally, it will be noted that leakage of the pumped liquid originating at other points throughout the cylinder block 60 is also conveyed directly to the scavenger pump 72 and thus cannot enter the spacer block 58. For example, the passage means 200 and 202 conduct leakage liquid passing the loading ring 192 directly to the inlet passage 74 of the scavenger pump 72. As will become apparent, the passage means 200 and 202 also convey leakage liquid passing sealing means of the inlet and outlet check valves 152 and 154 to the inlet passage 74 of the scavenger pump 72. Thus, very little of the pumped liquid leakage originating in the cylinder block 60 enters the spacer block 58, virtually all of it being conducted directly to the scavenger pump 72 by the inlet passage 74.

*Alternative Liner Assembly*

FIG. 10 of the drawings illustrates an alternative liner assembly 210 which is similar to the liner assembly 134 and which includes a liner 212 and a liner head 214, a plunger bore 216 for one of the pump plungers 128 being provided in the liner. In this case, the liner head 214 is provided with an enlarged bore 218, considerably larger than the bore 177, with which inlet and outlet ports 220 and 222 communicate, these inlet and outlet ports respectively registering with the corresponding inlet and outlet ports 140 and 142 in the cylinder block 60.

The enlarged bore 218 in the liner head 214 provides a larger clearance volume for the pump plunger 128 than that provided by the bore 177 in the liner head 176. Thus, the pump plunger clearance volumes may be varied readily as desired by substituting the liner assembly 210 for the liner assembly 134, or vice versa. Liner assemblies, not shown, having other pump plunger clearance volumes may also be provided. One set of liner assemblies may be substituted for another very readily by removing the closures 138 for the upper ends of the liner bores 132. As each liner assembly is removed from its liner bore 132, the pump plunger 128 carried thereby is automatically removed also.

In a similar manner, liner assemblies, not shown, having plunger bores and pump plungers of different diameters may be used interchangeably. For example, it may be desired to change the pump plunger diameter to change the volumetric output of the triplex pump 30.

*Inlet Check Valve 152*

Referring particularly to FIG. 4 of the drawings, each inlet check valve 152 includes a housing having an annular shoulder 224 engageable with the annular seat 148. The retaining member 162 is threadedly connected to the housing of the inlet check valve 152 and is seated against an annular shoulder 226 thereon. The discharge pressure of the pumping means 62 is applied to the outer end of the retaining member 162, in a manner to be described, to hydraulically bias the inlet check valve 152 into engagement with its annular seat 148. The area of the outer end of the retaining member 162 is larger than the area of the inlet check valve 152 which is exposed to the maximum pressure produced by the pump plunger 128, wherefore the pumping means discharge pressure applied to the outer end of the retaining member maintains the inlet check valve in engagement with its annular seat 148.

Considering the manner in which the discharge pressure of the pumping means 62 is applied to the outer end of the retaining member 162, the retaining member extends outwardly from its bore 160 in the inlet manifold 158 into a bore 228 in the corresponding closure 164. The outer end of the bore 228 communicates with the outer end of the corresponding liner bore 132 through a passage means 230 formed partly in the cylinder block 60, partly in the inlet manifold 158 and partly in the closure 164. Since the outer end of the liner bore 132 contains fluid at the pressure produced by the pumping means 62, the discharge pressure of the pumping means is applied to the outer end of the retaining member 162 for the purpose hereinbefore described.

The housing of the inlet check valve 152 is sealed against the maximum pressure produced by the pump plunger 128 in the same way as the liner head 176 is sealed against such pressure. More particularly, the housing of the inlet check valve 152 is encircled by an annular sealing element 232 which is compressed against an external annular shoulder on the housing of the inlet check valve by a pressure amplifying or loading ring 234. This loading ring has a small annular area 236 engaging the annular sealing element 232 and a large, oppositely facing annular area 238 exposed to the discharge pressure of the pumping means 62 present in the passage means 230 by way of a branch passage 240 in the inlet manifold 158. The loading ring 234 is also provided with an annular area 242 which faces in the opposite direction from the area 238 and which is exposed to substantially atmospheric pressure through the previously described passage means 202.

Thus, the annular sealing element 232 is subjected to a pressure several times the maximum pressure produced by the pump plunger 128, in much the same manner that the liner head sealing element 190 is subjected to an amplified pressure. Consequently, damage to the sealing element 232 through internal friction resulting from expansion and contraction in rhythm with the pulsating pressure between the inlet and outlet check valves 152 and 154 is avoided.

Considering the structure of the inlet check valve 152 in more detail, its housing includes a body 244 to one end of which the retaining member 162 is threadedly connected and to the other end of which a cage 246 is threadedly connected. The body 244 carries a seat comprising concentric inner and outer rings 248 and 250. Circumferentially spaced passages 252 extend longitudinally through the valve body 244 between the rings 248 and 250, and a central passage 254 extends longitudinally through the valve body within the inner ring 248. The outer ends of the passages 252 and 254 communicate with the inlet passage 156 in the inlet manifold 158 through ports 256, FIG. 9, in the retaining member 162.

Backflow past the valve seat provided by the concentric rings 248 and 250 is prevented by a valve element, specifically a valve plate 258, carried by the cage 246 and biased into engagement with the concentric rings by a compression spring 260. The pumped liquid passes through the gate 246 either by way of circumferentially spaced peripheral ports 262 therein, or by way of an axial port 264 therein.

Because of the high speed at which the triplex pump 30 of the invention operates, the valve plate 258 must have as low a mass as possible to minimize its inertia, whereby the valve plate is capable of extremely high accelerations and decelerations in moving from its closed position to its open position and back again. Additionally, the valve plate 258 must have high structural strength to withstand the peak pressure differential of several thousand p.s.i. to which it is cyclically subjected. It has been found that the necessary low mass and high strength may be attained by making the valve plate 258 out of titanium carbide.

Also, in order that the valve plate 258 may accelerate and decelerate at the necessary high rates, it is essential that friction between the valve plate and its cage 246 be reduced to an absolute minimum. This is accomplished by providing the valve cage 246 with three circumferentially spaced, longitudinally extending, tungsten carbide pins 266. As best shown in FIG. 8, each pin 266 is disposed partially within a longitudinal bore 268 in the valve cage 246, one side of the pin being exposed and being engaged by the periphery of the valve plate.

Not only does the foregoing guide means for the valve plate 258 minimize friction, but it also minimizes wear when the valve plate and the pins 266 are made of the materials indicated. When the valve plate 258 becomes excessively worn, it can readily be replaced by unscrewing the valve cage 246 from the valve body 244. At the same time, if necessary, the guide pins 266 can be removed from their bores 268 and replaced with new ones, knockout holes 267 being provided for this purpose.

As previously indicated, the valve plate 258 is subjected to a pressure differential which attains a value of several thousand p.s.i. and which varies cyclically between such value and a relatively low one. When the maximum pressure differential is applied to the valve plate 258, the total load thereon may be several tons, and such load must be borne by the concentric rings 248 and 250 forming the seat for the valve plate. However, the end faces of the rings 248 and 250, which end faces are ground flat in a common plane, must be as narrow as possible. Otherwise, an excessively high momentary pressure differential across the valve plate 258 would be required to initially disengage the valve plate from the end faces of the rings 248 and 250 due to the differential area across the valve plate produced by engagement thereof with such end faces. The high load which the end faces of the rings 248 and 250 must sustain, coupled with the necessary narrowness of these end faces, makes mandatory the use of a material like tungsten carbide for the rings 248 and 250 to provide an adequate service life.

The rings 248 and 250 are preferably secured to the valve body 244 by silver brazing, which must be carried out at a relatively high temperature. In view of this, the tungsten carbide rings 248 and 250 must be mounted on the valve body 244 in such a manner that cooling of the assembly after brazing will not subject the tungsten carbide rings to tensile stresses as the result of differential contraction of the tungsten carbide rings and the valve body, which is preferably steel. Steel has a coefficient of expansion about 2.4 times that of tungsten carbide and, if the resulting differential contraction upon cooling from the brazing temperature were permitted to place the tungsten carbide rings in tension, they would probably fracture.

The foregoing problem is overcome by insuring that, upon cooling from the brazing temperature, the steel valve body 244 is in tension and the tungsten carbide rings 248 and 250 are in compression. This is accomplished by inserting the rings 248 and 250 into cylindrical recesses 270 and 272 the circumferential walls of which contact only the outer circumferential walls of the respective rings, the inner circumferential walls of the rings being spaced from and out of contact with the valve body 244. Expressed more simply, both rings 248 and 250 are male parts and the valve body 244 is a female part with respect to both rings. The result of this construction is that cooling of the valve body 244 and the rings 248 and 250 after brazing subjects the steel of the valve body to high tensile stresses and subjects the tungsten carbide of the rings to corresponding compressive stresses, which is the desired relation.

After assembling the valve body 244 and the rings 248 and 250 in the foregoing manner, the end faces of the rings which are engageable by the valve plate are ground flat in a common plane, the valve plate itself also being ground flat. The outer ring 250 provides the desired fluid-tight seal when the valve plate 258 is seated thereagainst, the primary function of the inner ring 248 being to support the central portion of the valve plate.

Whenever the rings 248 and 250 become worn excessively, they may be removed from the valve body 244 upon heating thereof and may be replaced by new ones. The latter are assembled with the valve body 244 in the manner hereinbefore described.

It will be apparent that each of the inlet check valves 152 may be removed readily for servicing, replacement or the like, by removing the corresponding closure 164 and withdrawing the inlet check valve by withdrawing the corresponding retaining member 162. Since the retaining member is attached to the inlet check valve, the two components are removed simultaneously.

*Outlet Check Valve 154*

The outlet check valves 154 are identical to the inlet check valves 152, the only difference being that the orientation of the outlet check valves relative to the pump plungers 128 is opposite to the orientation of the inlet check valves relative thereto. More simply, the inlet check valves 152 open inwardly toward the pump plungers 128 and the outlet check valves 154 open outwardly away from the pump plungers. Consequently, it is not necessary to consider the structure of the outlet check valves 154 in detail, it being necessary to consider only the reversed orientation thereof.

Referring particularly to FIG. 4 of the drawings, each outlet check valve 154 is disposed in its outlet valve bore 146 with the annular shoulder thereof which corresponds to the annular shoulder 226 of the inlet check valve 162 seated against the annular outlet valve seat 150. The discharge pressure of the pumping means 62 holds the outlet check valve 154 against its annular seat 150 in a manner to be described hereinafter, once such discharge pressure has been developed upon putting the triplex pump 30 into operation. The outlet check valve 154 is temporarily held substantially in its operating position mechanically by a pin 274 on the corresponding closure 172.

The housing of each outlet check valve 154 is sealed with respect to the cylinder block 60 in substantially the same manner as the inlet check valves 152 and the liner heads 176. More particularly, an elastomeric annular sealing element 276 is seated against an external annular shoulder on the housing of the outlet check valve 154 and is engaged by a small annular area 278 of a pressure amplifying or loading ring 280 having an oppositely facing, large annular area 282 exposed to the discharge pressure in the bore 168. An annular area 284 facing in the opposite direction from the area 282 is exposed to substantially atmospheric pressure through a passage 286 in the cylinder block 60 which communicates with the previously described passage means 200. Thus, the pressure applied to the sealing element 276 by the loading ring 280 is several times the peak pressure produced by the pump plunger 128, whereby expansion and contraction of the sealing element, and consequent overheating thereof, are prevented.

Considering the manner in which the outlet check valve 154 is hydraulically maintained in engagement with its annular seat 150, it will be noted that the discharge pressure in the bore 168 acts inwardly, i.e., toward the pump plunger 128, on an area substantially equal to that encompassed by the outermost periphery of the loading ring 280. The peak pressure produced by the pump plunger 128 acts outwardly on a smaller area, viz., that enclosed by the annular sealing element 276. Even though the peak pressure produced by the pump plunger 128 is slightly higher than the discharge pressure in the bore 168, the area differential mentioned is sufficient to insure seating of the outlet check valve 154. In other words, the area 284 exposed to substantially atmospheric pressure is sufficiently large that a high net pressure force differential is always acting in a direction to maintain the outlet check valve 154 in engagement with its annular seat 150.

*Unloading Means*

Referring particularly to FIG. 4 of the drawings, each inlet check valve 152 is provided with an unloader 288 which, upon command, will hold the corresponding valve plate 258 off the seat therefor provided by the concentric rings 248 and 250. The unloaders 288 may be actuated to remove the pumping load of the pumping means 62 from the gas engine 32, wherefore no clutch is necessary between the gas engine and the triplex pump 30, as hereinbefore discussed. Also, if desired, the unloaders 288 may be utilized to kill any residual pressure between the inlet check valves 152 and the outlet check valves 154 when it is necessary to open up the cylinder block 60 for any reason.

Each unloader 288 comprises a piston 290 disposed in a bore 292 in the corresponding retaining member 162, the bore 292 being coaxial with the corresponding inlet valve bore 144. Projecting axially from the piston 290 is a rod 294 which terminates in a pin 296 extending axially into the central passage 254 in the body 244 of the housing of the corresponding inlet check valve 152. The pin 296 is reciprocable in a spider 298 in the central passage 254 and terminates in an elastomeric tip 300 engageable with the corresponding valve plate 258, the purpose of such tip being to prevent damage to the valve plate.

The inner side of each piston 290 is constantly exposed to substantially atmospheric pressure through a passage means 302 in the inlet manifold 158 and the corresponding retaining member 162, the passage means 302 communicating with the passage means 202 leading to the inlet of the scavenger pump 72 by way of the inlet passage 74 hereinbefore described. The outer side of each unloader piston 290 communicates with the control passage means 304 in the inlet manifold 158 and the corresponding retaining member 162. Normally, the control passage means 304 is at substantially atmospheric pressure, with the result that the unloader pistons 290 are in their outermost positions due to the fact that the discharge pressure of the booster pump 64 is applied to the inner ends of the rods 294 and the pins 296. Whenever it is desired to hold the inlet check valves 152 open, the control passage means 304 is pressurized to an extent sufficient to move the unloader pistons 290 inwardly to accomplish this.

A suitable control valve, not shown, may be provided to connect the control passage means 304 to substantially atmospheric pressure, or to a source of fluid under sufficiently high pressure to effect unloading. For example, the control passage means 304 may be connected to the outlet of the booster pump 64 when unloading is desired. Alternatively, the control passage means 304 may be connected to an accumulator, not shown, containing fluid under sufficient pressure for the purpose.

*Sealing Means for Crosshead Stems 130*

As hereinbefore discussed, the bulk of this leakage of the liquid being pumped is scavenged directly from the cylinder block 60 through the inlet passage 74 of the scavenger pump 72. However, some pumped liquid leakage nevertheless does enter the spacer block 58 and must be prevented from entering the crankcase 36 along the crosshead stems 130 in order to prevent contamination of the lubricating oil in the crankcase. Each crosshead stem 130 is provided with a sealing means or sealing assembly 306 for this purpose.

The problem of sealing the crosshead stems 130 is complicated by the fact that such stems are subjected to considerable random sidewise movement, both lateral and angular, as they reciprocate. Such random sidewise movement is due to the fact that it is inherently impossible to convert rotary crankshaft motion into absolutely linear reciprocatory motion, particularly at the high crankshaft speeds attained with the present invention. The random sidewise movement of the crosshead stems 130 is further increased because the crosshead stems are designed to float laterally to some extent in their guide bores 108, as will be discussed hereinafter. Thus, the sidewise movement of the crosshead stems 130 is quite large.

Elastomeric annular sealing elements will not seal reciprocating or rotating members properly unless the sealing elements and the reciprocating or rotary members are maintained concentric within very close tolerances. The present invention solves this problem in connection with the reciprocating crosshead stems 130 by so mounting the sealing assemblies 306 that they are free to follow the random sidewise motion of the crosshead stems, wherefore elastomeric annular sealing elements incorporated in the sealing assemblies remain concentric with the crosshead stems at all times. The floating sealing assemblies 306 thus represent an important feature of the present invention.

Referring particularly to FIGS. 11 and 12 of the drawings, each sealing assembly 306 includes an annular sealing sleeve or seal housing 308, shown as made in two parts disposed in end-to-end relation and suitably secured together, having therein two axially spaced bearings 310 and 312 through which the corresponding crosshead stem 130 slidably extends. The seal housing 308 extends into a bore 314 and a counterbore 316 in the spacer block 58 and is provided within the counterbore 316 with an external annular flange 318 having elastomeric mounting rings 320 disposed thereabove and therebelow. The lower mounting ring 320 is disposed between the annular flange 318 and the annular shoulder formed at the junction of the counterbore 316 and the bore 314. The upper mounting ring 320 is disposed between the annular flange 318 and an annular retaining member 322 extending into and suitably secured in the upper end of the counterbore 316. Substantial clearances are provided between the seal housing 308 and the circumferential wall of the bore 314, between the annular flange 318 and the circumferential wall of the counterbore 316, and between the seal housing and the retaining member 322.

With the foregoing construction, the elastomeric mounting rings 320 permit the seal housing 308 to move both laterally and angularly with the crosshead stem 130 in response to such movement of the crosshead stem. Consequently, elastomeric annular sealing elements carried by the seal housing 308, which sealing elements will be described hereinafter, are maintained substantially concentric with the crosshead stem 130 despite random sidewise movement of the latter, which is an important feature. The mounting rings 320 do permit slight axial movement of the seal housing 308, but this is negligible due to the fact that the mounting rings are maintained in a state of compression by the retaining member 322.

It will be noted that the mounting rings 320 also act as sealing rings between the spacer block 58 and the seal housing 308. Consequently, they prevent leakage from the spacer block 58 into the crankcase 36 externally of the seal housing 308.

The seal housing 308 carries a lower, downwardly facing lip seal 324 and an upwardly facing lip seal 326 above the seal 324, both of these seals engaging the crosshead stem 130 and remaining substantially concentric therewith at all times due to the floating mounting of the seal housing provided by the mounting rings 320. The downwardly facing seal 324 strips lubricating oil from the crosshead stem 130 as the crosshead stem moves upwardly, leaving only an extremely thin film of a few microns in thickness. Similarly, the upwardly facing seal 326 wipes leakage liquid from the crosshead stem 130 as the crosshead stem moves downwardly so as to prevent such leakage liquid from entering the crankcase 36, any film of leakage liquid left on the crosshead stem by the seal 326 also being extremely thin. Since the seals 324 and 326 act unidirectionally, the microscopic films they leave on the crosshead stem 130 are virtually undisturbed by the respective seals as the films are withdrawn from the space between the seals. Thus, there is substantially no tendency for the lubricating oil and the leakage liquid in the two films to mingle since each film is withdrawn from the space between the seals 324 and 326 virtually intact.

Further, the axial spacing of the seals 324 and 326 is slightly greater than the stroke of the crosshead stem 130, the difference between the seal spacing and the crosshead stem stroke being indicated by the double-headed arrow 328 in FIG. 11. Consequently, neither of the seals 324 and 326 ever comes into engagement with the portion of the crosshead stem 130 which is engaged by the other of such seals. Therefore, it is impossible for the seal 324 to strip off any of the leakage liquid film passing the seal 326 and thus pump it into the crankcase 36.

It will be noted that the seals 324 and 326 are between the bearings 310 and 312. Thus, the lower bearing 310 is lubricated by lubricating oil from the crankcase 36, the lubricating oil reaching this bearing from the corresponding crosshead 110. The manner in which the lubricating oil is delivered to the crosshead 110 will be considered hereinafter. The upper bearing 312 is lubricated by the leakage liquid, such liquid normally being crude oil, which has adequate lubricating qualities for the purpose. Also, as will be discussed hereinafter, lubricating oil from the crankcase 36 is metered into the leakage liquid in small quantities and this helps to lubricate the upper bearing 312.

Carried by the seal housing 308 above the upper bearing 312 and engaging the crosshead stem 130 is another upwardly facing lip seal 330. This lip seal has two functions. First, it wipes abrasive particles which may be entrained in the leakage liquid from the crosshead stem 130 as it moves downwardly into the upper bearing 312, thereby protecting such bearing. Second, the seal 330 co-operates with the seal 326 to provide a pumping action for the purpose of circulating relatively clean liquid through the space between the seals 326 and 330, thereby lubricating these seals and the intervening bearing 312 and flushing away any foreign matter which may tend to accumulate on the upper seal 330.

The seals 326 and 330 co-operate to pump leakage liquid into the space therebetween from an annular reservoir 332 carried by the sealing housing 308, such reservoir being formed by suitably mounting a sleeve 334 on the seal housing. The sleeve 334 carries a cap 336 for the reservoir 332, such cap providing a clearance 338 around the crosshead stem 130 through which pumped fluid leakage may flow downwardly along the crosshead stem into the reservoir.

The seals 326 and 330 pump liquid from the reservoir 332 into the space therebetween through an annular channel 342 and a port 344 in the seal housing 308. Telescoped over the seal housing and covering the channel 342 is an annular filter 346 of sintered metal, or the like. Thus, the liquid pumped into the space between the seals 326 and 330 is relatively clean, which is an important feature.

Considering how the seals 326 and 330 provide the pumping action mentioned, a substantial quantity of liquid is carried upwardly through the upper seal 330 during each upward stroke of the crosshead stem 130. However, since there is only a microscopic liquid film on the crosshead stem below the seal 326, no liquid is carried into the space between the seals 326 and 330 by the crosshead stem during its upward movement to replace that carried out by the crosshead stem past the upper seal 330. This results in a slight negative pressure between the seals 326 and 330 during the upward stroke of the crosshead stem 130, with the result that liquid is drawn from the reservoir 332 through the filter 346 into the space between the seals 326 and 330.

The liquid carried upwardly past the upper seal 330 by the crosshead stem 130 is wiped off, except for a very thin film, during the subsequent downward stroke of the crosshead stem, the liquid wiped off in this fashion flowing back into the reservoir 332. In the process, it flushes foreign matter from the upper side of the upper seal 330, which is an important feature.

As previously mentioned, lubricating oil from the crankcase 36 is constantly added to the leakage liquid in each sealing assembly 306 so that the liquid in the reservoir 332 contains a high proportion of clean lubricating oil. The lubricating oil from the crankcase 36 is metered into each reservoir 332 at a rate of about one-third quart every twenty-four hours, for example.

Considering how the lubricating oil from the crankcase 36 is supplied to each reservoir 332, the spacer block 58 is provided with lubricating oil passage means 348, FIGS. 12 and 25, each of which, as shown in phantom in FIG. 11 communicates with the space between the mounting rings 320 associated with the corresponding seal housing 308. From each of these spaces, the lubricating oil flows upwardly through a passage means 350 in the corresponding seal housing 308 into a standpipe 352 within the corresponding reservoir 332.

In order to meter the lubricating oil into each reservoir 332 at the desired low rate for the particular lubricating oil pressure provided, which may be of the order of 60 p.s.i., the lubricating-oil flow rates into the three passage means 348 are correspondingly limited in a manner which will now be described. The lubricating oil discharged by the lubricant pump 92 enters the spacer block 58 through a passage means 492, FIGS. 15 and 25, and flows into a counterbore 494 in the spacer block, the outer end of this counterbore being closed by a plug 496. The counterbore 494 communicates at its inner end with a bore 498 into which is threaded a housing 500 removable through the counterbore 494 upon removal of the plug 496. The housing 500 carries a sintered metal filter 502 and provides an orifice 504. The lubricating oil entering the counterbore 494 by way of the passage means 492 flows first through the filter 502 and then through the orifice 504, the discharge pressure of the lubricant pump 92 being throttled to a very low value by the orifice. However, the pressure on the downstream side of the orifices 504 is still too high to meter lubricating oil to the reservoirs 332 at the desired low rates.

From the inner end of the bore 498, the lubricating oil, at its now relatively low pressure, flows into a lateral passage means 506, FIG. 25, which communicates with three spaced, parallel bores 508 in the spacer block 58. The bores 508 respectively communicate at their inner ends with the aforementioned passage means 348 leading to the respective spaces between the mounting rings 320 associated with the respective seal housings 308. Removably threaded into each bore 508 is a housing 510 having in its inner end an axial bore 512 which communicates with the corresponding bore 508 through radial ports 514 and an annular channel 516. Threaded into the axial bore 512 is a capillary tube 518. Lubricating oil may flow from the passage means 506 into each passage means 348 through the corresponding annular channel 516, radial ports 514, axial bore 512 and capillary tube 518.

The passage means 506, in addition to communicating with the three bores 508, also communicates with a passage means 520 leading to a vertical bore 522 in the spacer block 58. Disposed in the bore 522 is a housing 524 which is provided with an axial passage 526 communicating with the passage means 520 through radial ports 528 and an annular channel 530. Communicating at its lower end with the upper end of the axial passage 526 and extending upwardly from the housing 524 is a standpipe 532 which is disposed within the ventilation passage 88 connecting the interior of the crankcase 36 to the interior of the spacer block 58. As will be apparent, any lubricating oil spilling over the top of the standpipe 532 flows downwardly through the ventilation passage 88 back into the crankcase 36. The amount of such return flow is small because of the throttling effect of the orifice 504.

As indicated by the double-headed arrow 534 in FIG. 26, the upper end of the standpipe 532 is slighlty higher than the upper ends of the standpipes 532 within the reservoirs 332 of the crosshead stem seals 306. This difference in elevation may be of the order of one inch, for example, and provides a corresponding pressure head across the three capillary tubes 518. The small pressure head indicated by the double-headed arrow 534 and the flow resistances provided by the capillary tubes 518 combine to provide the desired rates of metering of lubricating oil into the reservoirs 332 of the three sealing assemblies 306.

Liquid is constantly drawn off from each reservoir 332 through a standpipe 354 carried by the seal housing 308 within the reservoir and communicating with a drain passage means 356 in the seal housing and in the retaining member 322, such drain passage means discharging into the interior of the spacer block 58. The standpipe 354 is disposed within a cylinder 358 carried by the seal housing 306, this cylinder being open at its upper end and being provided with ports 360 at its lower end, i.e., at the bottom of the reservoir 332. This construction provides a siphoning means which constantly draws liquid from the reservoir 332 down to the level of the upper end of the standpipe 354, and which draws such liquid from the bottom of the reservoir. This latter is important if the liquid being pumped is or includes water since the water is always siphoned off. Consequently, the liquid pumped into the space between the seals 326 and 330 is oil.

*Scavenger Pump 72*

Referring particularly to FIGS. 12 and 13 of the drawings, the scavenger pump 72 is shown as a jet pump having a nozzle 362 with which the supply passage 78 from the booster pump 64 communicates. The nozzle 362 discharges into a divergent passage 364 which communicates with the outlet passage 80. The liquid to be pumped is drawn into the throat of the jet scavenger pump 72 through a passage 366 therein. In the passage 366 is a check valve 367 which prevents back flow into the spacer block 58 in the event the throat of the scavenger pump 72 becomes plugged for any reason.

The scavenger pump 72 is mounted on the spacer block 58 at one end thereof and with the passage 366 in communication with a well 368 in the spacer block. As best shown in FIG. 3, the inlet passage 74 which conveys leakage liquid from the cylinder block 60 communicates with the well 368. The spacer block 58 is also provided with a bottom wall or sump 370 which slopes toward the well 368, the hereinbefore-mentioned inlet passage 76 draining fluid from the low end of the sump 370 into the well 368, from whence it enters the scavenger pump 72 by way of the passage 366. The drain passage means 356 of each sealing assembly 306 discharges into the sump 370, as shown in FIG. 11. Also, leakage liquid from the cylinder block 60 which does not enter the sealing assemblies 306 drains downwardly into the sump 370 and thence is drawn into the scavenger pump 72. Thus, the scavenger pump 72 scavenges leakage liquid from both the cylinder block 60 and the spacer block 58.

*Ventilating Means 82*

Referring to FIGS. 3, 18 and 19 of the drawings, and particularly the latter two figures, the ventilating means 82 is mounted on top of the crankcase 36 at one end thereof and includes a nozzle 372 which is supplied with lubricating oil from the lubricant pump 92 through the passage 94, shown diagrammatically in FIG. 1. The lubricating oil is discharged by the nozzle 372 against a Pelton wheel 374 which drives an impeller 376 through a shaft 378. The impeller 376 draws in air from the atmosphere through the air inlet 84, the latter including an air filter or cleaner 380, FIG. 3. The filtered air discharged by the impeller 376 flows downwardly through the passage 86 into the crankcase 36. This ventilating air flows from the crankcase 36 through the crosshead block 56 into the spacer block 58 by way of the passage 88, and then flows into the atmosphere, or to a suitable point of vapor disposal, through the outlet 90. Thus, not only is the crankcase 36 itself continuously scavenged of contaminating vapors, but the spacer block 58 is scavenged of light-end vapors from the liquid being pumped which might otherwise condense within the spacer block 58 and make their way into the crankcase through the sealing assemblies 306 for the crosshead stems 130.

*Lubrication of Crossheads 110*

As shown in FIGS. 14 and 15 of the drawings, there is a substantial clearance between each crosshead 110 and its guide bore 108 to minimize friction. Each crosshead 110 is centered in its guide bore hydrodynamically by lubricating oil from the lubricant pump 92 by discharging the lubricating oil into the guide bore at several, e.g., four, circumferentially spaced points.

As shown in FIG. 14, the crosshead block 56 is provided with lubricating oil passage means 382 on opposite sides of the crosshead guide bores 108, such passage means being suitably connected to the lubricant pump 92 in a manner not specifically shown. The passage means 382 supply lubricating oil to ports 384, which communicate with and are spaced circumferentially of each crosshead guide bore 108, the ports 384 communicating with longitudinal grooves 386 in the corresponding crosshead 110 of a length at least equal to the crosshead stroke.

With the foregoing lubrication system for each crosshead 110, if the crosshead tends to move laterally toward one side of the corresponding guide bore 108, it encounters an increasing pressure field on that side of the guide bore due to the decreasing clearance. The pressure field on the opposite side of the crosshead 110 decreases due to the increasing clearance on such opposite side. Consequently, the moment that the crosshead 110 starts to move laterally, it is subjected to a pressure force differential which returns it to center, thereby preventing metal-to-metal contact between each crosshead and the wall of its guide bore 108.

*Lubrication of Connecting Rod Bearings 122*

The connecting rod bearings 122 are lubricated from above by way of the crossheads 110, thereby eliminating any necessity for lubricating them through the crankshaft 42. Considering how this is accomplished, each crosshead 110, as best shown in FIG. 14, is provided with ports 388 which communicate with the grooves 386 and which extend inwardly to annular grooves 390 in the crosshead around the corresponding wrist pin 124, these annular grooves being interconnected by a longitudinal passage 392, FIGS. 11 and 15, in the wrist pin 124. As shown in FIG. 11, the passage 392 communicates intermediate its ends with an annular groove 394 in the wrist pin 124 by means of which the wrist pin bearing 126 is lubricated. From the annular groove 394, the lubricating oil flows through a port 396 in the wrist pin bearing 126 into a passage 398 in the corresponding connecting rod 120. Referring to FIG. 3 of the drawings, the passage 398 in the connecting rod 120 terminates at its lower end in a port 400 in the corresponding connecting rod bearing 122, thereby lubricating the connecting rod bearing. Thus, all of the connecting rod bearings 122 are lubricated from above by way of the crossheads 110.

*Lubricant Pump 92*

Referring to FIGS. 3, 20 and 21 of the drawings, the crankcase 36 is provided therein with an integral lubricant pump housing 402 having therein a cylindrical bore 404 the axis of which is spaced from and parallel to the axis of the crankshaft 42. The lubricant pump 92 has the form of a self-contained cartridge which is insertable into and removable from the bore 404 as a unit. The crankcase 36 is provided with a removable access panel, not shown, for the purpose of installing and removing the lubricant pump 92.

More particularly, the lubricant pump 92 comprises a case 406 which is insertable into the bore 404 and which is provided at one end with an annular flange 408 engageable with one end of the housing 402 to properly position the lubricant pump axially of its housing. The lubricant pump 92 is held in its proper position in the housing 402 by a single set screw 410, FIG. 20, threaded through and accessible from the exterior of the crankcase 36 and engageable with the periphery of the flange 408 of the case 406.

The case 406 contains a conventional pumping means of, for example, the internal gear type which is driven by a shaft 412 projecting from the end of the case 406 opposite the flange 408 and oriented parallel to the axis of the crankshaft 42. The pumping means within the case 406 communicates with inlet and outlet ports in the case which are not specifically identified in the drawings, but which communicate with annular inlet and outlet grooves 414 and 416 in the case. The annular inlet and outlet grooves 414 and 416 respectively communicate with the inlet passage 100 and an outlet passage 420, both formed in the crankcase 36, the communication between the inlet and outlet grooves 414 and 416 and the inlet and outlet passages 100 and 420, respectively, obtaining for any angular position of the lubricant pump case 406 in its housing 402, which is important for a reason that will become apparent. As shown in FIG. 21, the inlet passage 100 communicates directly with the interior of the crankcase 36, while the outlet passage 420 leads to elements which will be described hereinafter.

It will be noted that the foregoing construction avoids external pipe connections, or the like, the inlet and outlet grooves 414 and 416 automatically registering with the inlet and outlet passages 100 and 420, respectively, upon insertion of the lubricant pump case 406 into the housing 402. This, coupled with the fact that the case 406 is held in place by the single set screw 410, makes installation and removal of the lubricant pump cartridge in the field a simple matter.

An important feature of the invention resides in the manner in which the inlet and outlet grooves 414 and 416 and the inlet and outlet passages 100 and 420 are sealed relative to each other and to the interior of the crankcase 36. The inlet and outlet grooves 414 and 416 are defined by annular lands having therein annular grooves 422 for O-rings 424. The axial dimension of each groove 422 is less than the radial dimension thereof and each O-ring 424 has a normal or unstressed thickness greater than the axial dimension of the groove in which it is disposed, but less than the radial dimension thereof. When the lubricant pump 92 is in operation, the O-rings 424 are urged outwardly into fluid-tight engagement with the circumferential wall of the bore 404 by applying the discharge pressure of the lubricant pump to the inner peripheries of the O-rings. This is accomplished by connecting the annular outlet groove 416 to the bottoms of the grooves 422 through a port 426, a passage 428 and ports 430.

With the foregoing construction, the O-rings 424 exert no drag when the case 406 is being inserted into, or removed from, the bore 404, there being no pressure applied to the O-rings under such conditions. Therefore, the lubricant pump cartridge is easily removed and installed.

Considering the manner in which the lubricant pump 92 is driven, its shaft 412 is provided thereon with a sprocket 432 laterally opposite a sprocket 434 on the crankshaft 42 at the end thereof opposite the gas engine 32. Trained around the sprockets 432 and 434 is a chain 436.

The shaft 412 is eccentrically located relative to the case 406, i.e., it is parallel to, but spaced from the central axis of the case. Consequently, the axis of the shaft 412 is spaced from the axis of the bore 404 in the lubricant housing 402.

With the foregoing construction, the tension in the chain 436 can be adjusted readily to the proper value merely by rotating the lubricant pump cartridge in its housing 402, the proper angular position being maintained by the set screw 410. Thus, an extremely easy means of adjusting the chain tension is provided.

As previously pointed out, the annular inlet and outlet grooves 414 and 416 communicate with the inlet and outlet passages 100 and 420 for all angular positions of the lubricant pump cartridge. Consequently, rotation of the cartridge in adjusting the tension in the chain 436 in no way interferes with the operation of the pump.

*Lubricating Oil Filter and Pressure Control Valve*

A shown in FIGS. 20 and 22, the oulet passage 420 from the lubricant pump 92 communicates with a filter chamber 438 integral with the crankcase 36. The filter chamber 438 has an open upper end at the top of the crankcase 36 for insertion and removal of a replaceable filter element 440, the filter chamber normally being closed by a removable cover 442. The lubricating oil flowing into the filter chamber 438 from the outlet passage 420 flows through the filter element 440 into the interior thereof and is discharged through a port 444, FIG. 22, into a passage 446 leading to the various points in the triplex 30 where lubricating oil is required. The filter element 440 may be of any suitable type and may be provided with a bypass in the usual manner.

Referring to FIGS. 22 to 24 of the drawings, the outlet passage 446 for filtered lubricating oil is a bore having at one end thereof a counter bore 448 which communicates with the interior of the crankcase through a bypass port 450, FIG. 20. Threaded into the outer end of the counterbore 448 outwardly of the bypass port 450 and extending axially through the counterbore into the outlet passage 446 is a housing 452 of a pressure control valve or pressure relief valve 454, the housing 452 being sealed relative to the crankcase 36 on opposite sides of the bypass port 450 by O-rings 456 and 458. The housing 452 is provided with a bore 460 which communicates at one end with the outlet passage 446 and which communicates at its other end with a counterbore 462 containing a piston 464 biased toward an annular seat 466 at the junction of the bore 460 and the counterbore 462 by a compression spring 468. The force applied to the piston 464 by the spring 468 may be varied by an adjusting screw 470 threaded into the outer end of the counterbore 462. The counterbore 462 is closed and sealed outwardly of the adjusting screw 470 by a threaded plug 472 carrying an O-ring 474.

As best shown in FIG. 23, the housing 452 of the pressure control valve 454 is provided with a plurality of radial ports 476 spaced apart along a helical path, such ports communicating at their inner ends with the counterbore 462 and communicating at their outer ends with the bypass port 450 by way of the counterbore 448. As will be apparent, if the lubricating oil pressure in the outlet passage 446 is above the value for which the spring 468 is set by means of the adjusting screw 470, the piston 464 will uncover portions of some or all of the radial ports 476 to bypass excess lubricating oil back to the crankcase 36. The spiral or helical arrangement of the radial ports 476 provides excellent sensitivity and results in metering of excess lubricating oil back to the crankcase 36 without chattering, the lubricating oil pressure in the outlet passage 446 thus being extremely uniform.

It will be noted that the adjusting screw 470 is accessible from the exterior of the crankcase 36. Consequently, the lubricating oil pressure can be adjusted readily while the triplex pump 30 is running.

The spring cavity between the piston 464 and the adjusting screw 470 is vented to the bypass 450 by radial ports 478 to prevent oil in the spring cavity from interfering with the operation of the pressure control valve 454.

*Booster Pump 64*

While the booster pump 64 may be of any suitable construction, it preferably is the booster pump disclosed in copending application Serial No. 58,251, filed September 26, 1960, by Francis Barton Brown, one of the applicants herein. The important thing about the booster pump 64 insofar as the present invention is concerned is its location.

The booster pump 64 includes a housing 480 which is bolted, or otherwise secured, directly to the crankcase 36 so that the booster pump is supported thereby. The booster pump 64 includes a pumping means, not shown, within the housing 480, such pumping means being driven by a shaft 482 which is axially aligned with the crankshaft 42 and in end-to-end relation therewith at the end thereof opposite the gas engine 32. The booster pump shaft 482 is driven directly by the crankshaft 42, and at the same speed, by a coupling means 484 which provides a direct coupling between the crankshaft and the booster pump shaft.

*Coupling Means 484*

The crankshaft 42 is provided thereon with a sprocket 486 which is identical to and axially aligned with the sprocket 434 thereon. The booster pump shaft 482 is provided thereon with a sprocket 488 identical to and axially aligned with the sprockets 486 and 434 on the crankshaft 42. The sprockets 486 and 488 are coupled together by a circular endless chain 490 wrapped around these sprockets.

The foregoing construction provides a very simple means of coupling the booster pump shaft 482 to the crankshaft 42 and one which will take care of minor misalignments of the booster pump shaft and the crankshaft. Another advantage is that the coupling means 484 permits very close coupling of the booster pump 64 to the triplex pump 30 proper, thereby minimizing the overall length of the installation.

Another advantage of integrating the coupling means 484 for the booster pump 64 and the driving means for the lubricant pump 92 is that both of the sprockets 434 and 486 may be cut with the same cutter in one pass during manufacture.

*Operation*

It is believed that the operation of the triplex pump 30 will be clear from the foregoing description and that no further explanation will be necessary.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. In combination:

(*a*) a motor base;

(*b*) a motor including a motor housing mounted on said motor base and including a motor shaft rotatable in said motor housing;

(*c*) a triplex pump including a cantilevered triplex pump housing mounted on one end of said motor housing;

(*d*) said triplex pump including a triplex pump crankshaft rotatable in said triplex pump housing and axially aligned with said motor shaft in end-to-end relation and directly coupled to said motor shaft so as to be driven at the same rotational speed as said motor shaft;

(*e*) said triplex pump further including three reciprocable pump plungers in said triplex pump housing and operatively connected to said triplex pump crankshaft;

(*f*) a booster pump for delivering fluid under pressure to said triplex pump;

(*g*) said booster pump including a cantilevered booster pump housing mounted on the end of said triplex pump housing farthest from said motor so that both said triplex pump and said booster pump are supported by said motor with said triplex pump between said motor and said booster pump; and (*h*) said booster pump having a booster pump shaft rotatable in said booster pump housing and aligned with said triplex pump crankshaft in end-to-end relation and directly coupled to said triplex pump crankshaft so that said booster pump shaft is driven at the same rotational speed as said motor shaft and said triplex pump crankshaft.

2. In combination:

(*a*) an engine base;

(*b*) an internal combustion engine of the reciprocating type including an engine housing mounted on said engine base and having an engine crankshaft rotatable in said engine housing;

(*c*) said internal combustion engine having an engine crankshaft speed in the range of from about 1000 r.p.m. to about 1800 r.p.m.;

(*d*) a triplex pump including a cantilevered triplex pump housing mounted on one end of said engine housing;

(*e*) said triplex pump including a triplex pump crankshaft rotatable in said triplex pump housing and axially aligned with said engine crankshaft in end-to-end relation and directly coupled to said engine crankshaft so as to be driven at the same rotational speed as said engine crankshaft;

(*f*) said triplex pump further including three reciprocable pump plungers in said triplex pump housing and operatively connected to said triplex pump crankshaft;

(*g*) a booster pump for delivering fluid under pressure to said triplex pump;

(*h*) said booster pump including a cantilevered booster pump housing mounted on the end of said triplex pump housing farthest from said engine so that both said triplex pump and said booster pump are supported by said engine with said triplex pump between said engine and said booster pump; and (*i*) said booster pump having a booster pump shaft rotatable in said booster pump housing and aligned with said triplex pump crankshaft in end-to-end relation and directly coupled to said triplex pump crankshaft so that said booster pump shaft is driven at the same rotational speed as said engine crankshaft and said triplex pump crankshaft.

References Cited in the file of this patent

UNITED STATES PATENTS

| | | |
|---|---|---|
| 1,083,568 | Ungar | Jan. 6, 1914 |
| 1,633,765 | Christensen | June 28, 1927 |
| 1,951,751 | Cooper | Mar. 20, 1934 |
| 2,081,224 | Coberly et al. | May 24, 1937 |
| 2,324,116 | Silvertsen | July 13, 1943 |
| 2,379,887 | Doble | July 10, 1945 |
| 2,715,875 | Towler et al. | Aug. 23, 1955 |

FOREIGN PATENTS

| | | |
|---|---|---|
| 711,791 | Germany | Oct. 7, 1941 |